(12) United States Patent
Shiina

(10) Patent No.: US 7,609,896 B2
(45) Date of Patent: Oct. 27, 2009

(54) RECORDER AND METHOD THEREFOR, PLAYER AND THEREFOR, PROGRAM, AND RECORDING MEDIUM

(75) Inventor: Hiroki Shiina, Kanagawa (JP)

(73) Assignee: Sony Corporation, Tokyo (JP)

( * ) Notice: Subject to any disclaimer, the term of this patent is extended or adjusted under 35 U.S.C. 154(b) by 736 days.

(21) Appl. No.: 11/284,038

(22) Filed: Nov. 22, 2005

(65) Prior Publication Data

US 2006/0110055 A1 May 25, 2006

(30) Foreign Application Priority Data

Nov. 24, 2004 (JP) .......................... P2004-338357

(51) Int. Cl.
*G06K 9/36* (2006.01)
(52) U.S. Cl. .................. 382/232; 382/305; 382/190
(58) Field of Classification Search ................ 382/232, 382/189, 190, 305, 118, 195; 348/231.2, 348/218.1, 222.1; 386/E9.013, 68, 111, 52, 386/55; 396/287; 707/4, 3; 358/1.18, 1.15
See application file for complete search history.

(56) References Cited

U.S. PATENT DOCUMENTS

| 5,761,655 | A  | * | 6/1998  | Hoffman ....................... 707/4 |
| 6,449,608 | B1 | * | 9/2002  | Morita et al. .................. 707/3 |
| 6,526,215 | B2 | * | 2/2003  | Hirai et al. .................... 386/52 |
| 6,970,192 | B2 | * | 11/2005 | Takayama ................ 348/231.2 |
| 7,236,684 | B2 | * | 6/2007  | Kawakami et al. ............ 386/52 |
| 7,495,795 | B2 | * | 2/2009  | Graham et al. ............. 358/1.18 |

FOREIGN PATENT DOCUMENTS

| JP | 2000-41209   | 2/2000 |
| JP | 2001-111963  | 4/2001 |
| JP | 2002-281432  | 9/2002 |
| JP | 2003-061013  | 2/2003 |
| JP | 2003-244612  | 8/2003 |
| JP | 2003-274361  | 9/2003 |
| JP | 2004-120329  | 4/2004 |
| JP | 2004-147204  | 5/2004 |

* cited by examiner

*Primary Examiner*—Anh Hong Do
(74) *Attorney, Agent, or Firm*—Finnegan, Henderson, Farabow, Garrett & Dunner, L.L.P.

(57) ABSTRACT

A recorder operable to compress and code first image data of a moving image, and record the compressed and coded first image data on a data recording medium, including: an extracting mechanism operable to extract second image data to display a still image from the first image data of the moving image to be recorded on the data recording medium; a creating mechanism operable to create thumbnail image data to display a thumbnail image as an image smaller than the still image from the extracted second image data; and a storage-controlling mechanism operable to control a temporary storage of the created thumbnail image data.

16 Claims, 25 Drawing Sheets

RECORDER AND METHOD THEREFOR, PLAYER AND THEREFOR, PROGRAM, AND RECORDING MEDIUM

CROSS REFERENCES TO RELATED APPLICATIONS

The present invention contains subject matter related to Japanese Patent Application JP 2004-338357 filed in the Japanese Patent Office on Nov. 24, 2004, the entire contents of which being incorporated herein by reference.

BACKGROUND OF THE INVENTION

1. Field of the Invention

The invention relates to a recorder and a method therefor, a player and a method therefor, a program and a recording medium. More specifically, it relates to a recorder and a method therefor, a player and a method therefor, a program and a recording medium, which enable a thumbnail image to be displayed in a shorter time (at a higher speed).

2. Description of the Related Art

A DVD playback device, such as a DVD (Digital Versatile Disk) recorder or a DVD video camera, often displays as a thumbnail image a representative of one or more images placed therein, which is referred to as e.g. title/chapter, for each image recording unit for the purpose of showing a user what is recorded on the data recording medium such as an optical disk with an image recorded thereon. Incidentally, the thumbnail image is an image smaller in size than its original image. In a DVD playback device like this, when a thumbnail image is displayed, the data to be utilized as a thumbnail image is read out from a moving image stream of an image data recorded on e.g. an optical disk, converted into thumbnail image data, and then displayed (See e.g. JP-A-2000-41209).

With a DVD playback device like this, in many cases two ore more thumbnail images are displayed in a screen, whereby a user can view them in a thumbnail list. In addition, when a large number of thumbnail images should be displayed, a thumbnail list containing a given number of thumbnail images is divided and displayed in pages.

The process to create a thumbnail image from a moving image stream recorded on an optical disk, which is to be executed when display of such thumbnail list is requested, takes a lot of time because the process includes reading from the optical disk and conversion to the thumbnail image.

As a countermeasure against this, many DVD playback devices operable to display a thumbnail image cache (or hold) a thumbnail image created by the process in a storage device or storage medium such as a semiconductor memory or hard disk, which are accessible at a high speed. As a result, when display of a thumbnail list is requested next time, the data reading from an optical disk and the conversion to a thumbnail image are omitted and thus display of a thumbnail image is speeded up. Otherwise, a measure of recording data after the conversion to a thumbnail image on an optical disk in itself, on which a moving image stream has been recorded and using the thumbnail image recorded on the optical disk at the time of displaying the thumbnail image is taken, thereby omitting the conversion to the thumbnail image and speeding up display of the thumbnail image.

With reference to the flow charts of FIGS. 1 and 2, a recording process in a conventional playback device will be described.

At Step S1, it is judged whether or not an instruction to start recording of video/sound data has been issued based on an operation by a user. The playback device waits until it is judged that an instruction to start the recording has been issued. When it is judged at Step S1 that an instruction to start the recording has been issued, the process proceeds to Step S2.

At Step S2, the playback device starts encoding, which starts encoding of video and sound data.

At Step S3, it is judged whether or not an instruction to terminate recording of video/sound data has been issued based on an operation by the user. The playback device waits until it is judged that an instruction to terminate the recording has been issued. When it is judged at Step S3 that an instruction to terminate the recording has been issued, the process proceeds to Step S4.

At Step S4, the playback device terminates the encoding of video and sound data.

At Step S5, the playback device writes the resultant data on a disk.

At Step S6 of FIG. 2, the playback device judges whether or not a thumbnail that should be displayed is present. When it is judged that a thumbnail that should be displayed is present, the process proceeds to Step S7.

At Step S7, the playback device judges whether or not the data of a thumbnail image has been cached. When it is judged that the thumbnail image data has not been cached, the process proceeds to Step S8. When it is judged that the thumbnail image data has been cached, the process proceeds to Step S10.

At Step S8, the playback device reads out data (video data) required to create the thumbnail image data from the disk and caches it. Then, at Step S9, the data read out by the process at Step S8 is converted into thumbnail data.

At Step S10, the playback device displays the thumbnail.

Also in the cases of DVD playback devices in reproduction, they reproduce moving pictures of two or more recording units (e.g. title/chapter). When a user makes a request to stop the reproduction, some of such DVD playback devices display a page of a thumbnail list containing a thumbnail of the recording unit (e.g. title/chapter) at the time of stopping the reproduction.

A reproduction process in a conventional playback device will be described with reference to the flow chart of FIG. 3.

At Step S31, it is judged whether or not an instruction to start reproduction of video/sound data has been issued based on an operation by a user. The playback device waits until it is judged that an instruction to start the reproduction has been issued. When it is judged at Step S31 that an instruction to start the reproduction has been issued, the process proceeds to Step S32.

At Step S32, the playback device starts decoding. Thus, decoding of video and sound data is started.

At Step S33, the playback device outputs an image and sound based on the decoded video and sound data.

At Step S34, it is judged whether or not an instruction to terminate recording of video/sound data has been issued based on an operation by the user. The playback device waits until it is judged that an instruction to terminate the recording has been issued. When it is judged at Step S34 that an instruction to terminate the recording has been issued, the process proceeds to Step S35.

At Step S35, the playback device terminates the decoding of video and sound data. After that, the process proceeds to Step S6 of FIG. 2 that has been described above.

SUMMARY OF THE INVENTION

Incidentally, immediately after recording a moving picture with a DVD playback device, users sometimes play the recorded moving picture.

In this case, many users stop the recording, display a thumbnail list, and select the moving picture recorded most recently on the screen to play it. However, in the case where a user displays a thumbnail list screen, it may be impossible that a thumbnail image of a newly recorded moving image is targeted for display in displaying a thumbnail list prior to it and as such, a DVD playback device does not cache a thumbnail image of the most recently recorded moving picture. Therefore, to display a thumbnail list containing a thumbnail image of the most recently recorded moving picture, a moving image stream must be loaded from an optical disk to create the thumbnail image data. The creation of thumbnail image data in this situation involves data loading from the optical disk and as such, it takes a long time before the thumbnail image is displayed to a user.

Likewise, also in the case where a DVD playback device is reproducing a moving picture, there is a possibility that a thumbnail of a recording unit (e.g. title/chapter) contained in a page of the thumbnail list that a user attempts to display is not cached in the DVD playback device. Therefore, the DVD playback device loads a moving image stream from the optical disk to create thumbnail image data. Consequently, it takes a lot of time before the thumbnail image is displayed to a user because loading from the optical disk and conversion to a thumbnail image are involved.

Thus, the related art has posed a problem such that it takes a lot of time before a thumbnail image is displayed to a user.

The invention was made in consideration of the foregoing problem, which makes possible to display a thumbnail image in a shorter time (at a higher speed).

A recorder according to an embodiment of the invention, which is operable to compress and code first image data of a moving image and record the compressed and coded first image data on a data recording medium, includes: an extracting mechanism operable to extract second image data to display a still image from the first image data of the moving image to be recorded on the data recording medium; a creating mechanism operable to create thumbnail image data to display a thumbnail image as an image smaller than the still image from the extracted second image data; and a storage-controlling mechanism operable to control a temporary storage of the created thumbnail image data.

The recorder may further include a display-controlling mechanism operable to control display of the thumbnail image based on the temporarily stored thumbnail image data.

The recorder may further include a record-controlling mechanism operable to control recording of the temporarily stored thumbnail image data on the data recording medium.

The extracting mechanism may extract the second image data from the compressed and coded first image data of the moving image.

The extracting mechanism may extract the second image data from the compressed and coded, and multiplexed first image data of the moving image.

A recording method according to an embodiment of the invention is a method to compress and code first image data of a moving image and record the compressed and coded first image data on a data recording medium, which includes the steps of: extracting second image data to display a still image from the first image data of the moving image to be recorded on the data recording medium; creating thumbnail image data to display a thumbnail image as an image smaller than the still image from the extracted second image data; and controlling a temporary storage of the created thumbnail image data.

A first recording medium according to the invention has a computer-readable program recorded thereon, in which the program is for use in a recording process including compressing and coding first image data of a moving image and recording the compressed and coded first image data on a data recording medium, and the program includes the steps of: extracting second image data to display a still image from the first image data of the moving image to be recorded on the data recording medium; creating thumbnail image data to display a thumbnail image as an image smaller than the still image from the extracted second image data; and controlling a temporary storage of the created thumbnail image data.

A first program according to an embodiment of the invention is intended to make a computer perform a recording process including compressing and coding first image data of a moving image and recording the compressed and coded first image data on a data recording medium, and includes the steps of: extracting second image data to display a still image from the first image data of the moving image to be recorded on the data recording medium; creating thumbnail image data to display a thumbnail image as an image smaller than the still image from the extracted second image data; and controlling a temporary storage of the created thumbnail image data.

In the recorder, method, and first program: second image data to display a still image is extracted from the first image data of the moving image to be recorded on the data recording medium; thumbnail image data to display a thumbnail image as an image smaller than the still image is created from the extracted second image data; and a temporary storage of the created thumbnail image data is controlled.

A player according to an embodiment of the invention, which is operable to read out compressed and coded first image data of a moving image from a data recording medium and reproduce the moving image from the read first image data, includes: an extracting mechanism operable to extract second image data to display a still image from the first image data read out from the data recording medium to reproduce the moving image; a creating mechanism operable to create thumbnail image data to display a thumbnail image as an image smaller than the still image from the extracted second image data; and a storage-controlling mechanism operable to control a temporary storage of the created thumbnail image data.

The player may further include a display-controlling mechanism operable to control display of the thumbnail image based on the temporarily stored thumbnail image data.

The player may further include a record-controlling mechanism operable to control recording of the temporarily stored thumbnail image data on the data recording medium.

The extracting mechanism may extract the second image data from the multiplexed first image data of the moving image.

The extracting mechanism may extract the second image data from the multiplexed first image data of the moving image separated from multiplexed data.

A reproducing method according to an embodiment of the invention is a method to read out compressed and coded first image data of a moving image from a data recording medium and reproduce the moving image from the read first image data, which includes the steps of: extracting second image data to display a still image from the first image data read out from the data recording medium to reproduce the moving image; creating thumbnail image data to display a thumbnail image as an image smaller than the still image from the extracted second image data; and controlling a temporary storage of the created thumbnail image data.

A second recording medium according to an embodiment of the invention has a computer-readable program recorded thereon, in which the program is for use in a reproduction process including reading out compressed and coded first image data of a moving image from a data recording medium, and reproducing the moving image from the read first image data, and the program includes the steps of: extracting second image data to display a still image from the first image data read out from the data recording medium to reproduce the moving image; creating thumbnail image data to display a thumbnail image as an image smaller than the still image from the extracted second image data; and controlling a temporary storage of the created thumbnail image data.

A second program according to an embodiment of the invention is intended to make a computer perform a reproduction process including reading out compressed and coded first image data of a moving image from a data recording medium and reproducing the moving image from the read first image data, and includes the steps of: extracting second image data to display a still image from the first image data read out from the data recording medium to reproduce the moving image; creating thumbnail image data to display a thumbnail image as an image smaller than the still image from the extracted second image data; and controlling a temporary storage of the created thumbnail image data.

In the player, method, and second program: second image data to display a still image is extracted from the first image data read out from the data recording medium to reproduce the moving image; thumbnail image data to display a thumbnail image as an image smaller than the still image is created from the extracted second image data; and a temporary storage of the created thumbnail image data is controlled.

The invention allows a thumbnail image to be displayed, and particularly enables display of a thumbnail image in a shorter time (at a higher speed).

DESCRIPTION OF THE PREFERRED EMBODIMENTS

The embodiments of the invention will be described below. The correspondences between the subject matters described herein and the embodiments can be exemplified as follows. The description here aims to confirm that the embodiments supporting the subject matters stated herein are described herein. Therefore, even when there is an embodiment which is contained herein, but not described here, that does not mean the embodiment does not correspond to the subject matter. Reversely, even when an embodiment is described here as corresponding to the subject matter, that does not mean the embodiment does not correspond to any subject matter other than the subject matter.

Further, the description here does not mean all the subject matters contained herein are claimed. In other words, the description here is not intended to deny the presence of a subject matter that is stated herein, but not claimed by the application, and more specifically the presence of a subject matter that may be applied as a division hereof or applied or added as an amendment hereto in the future.

Figure 1:
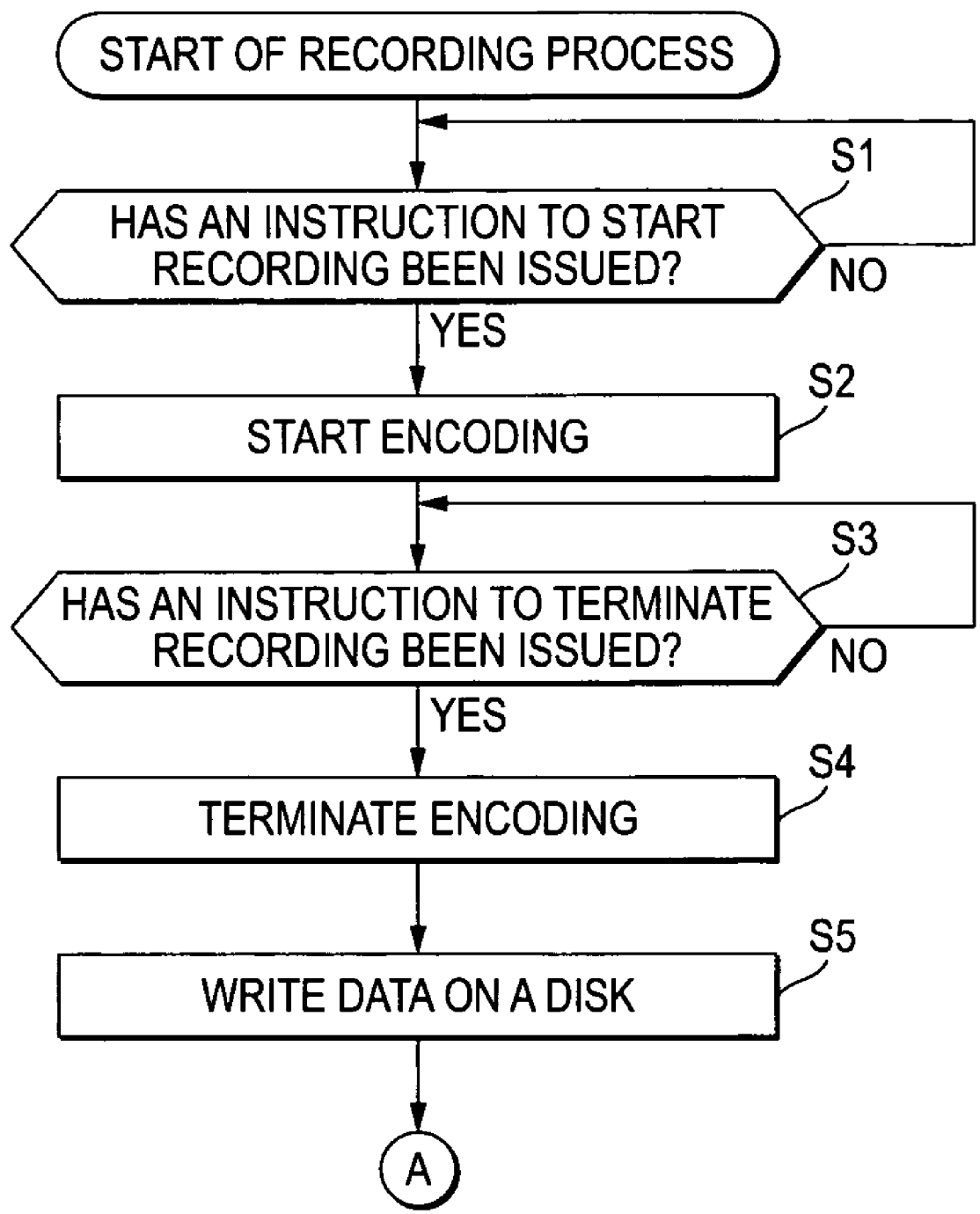
FIG. 1 is a flow chart of assistance in explaining an example of a conventional recording process.
Figure 2:
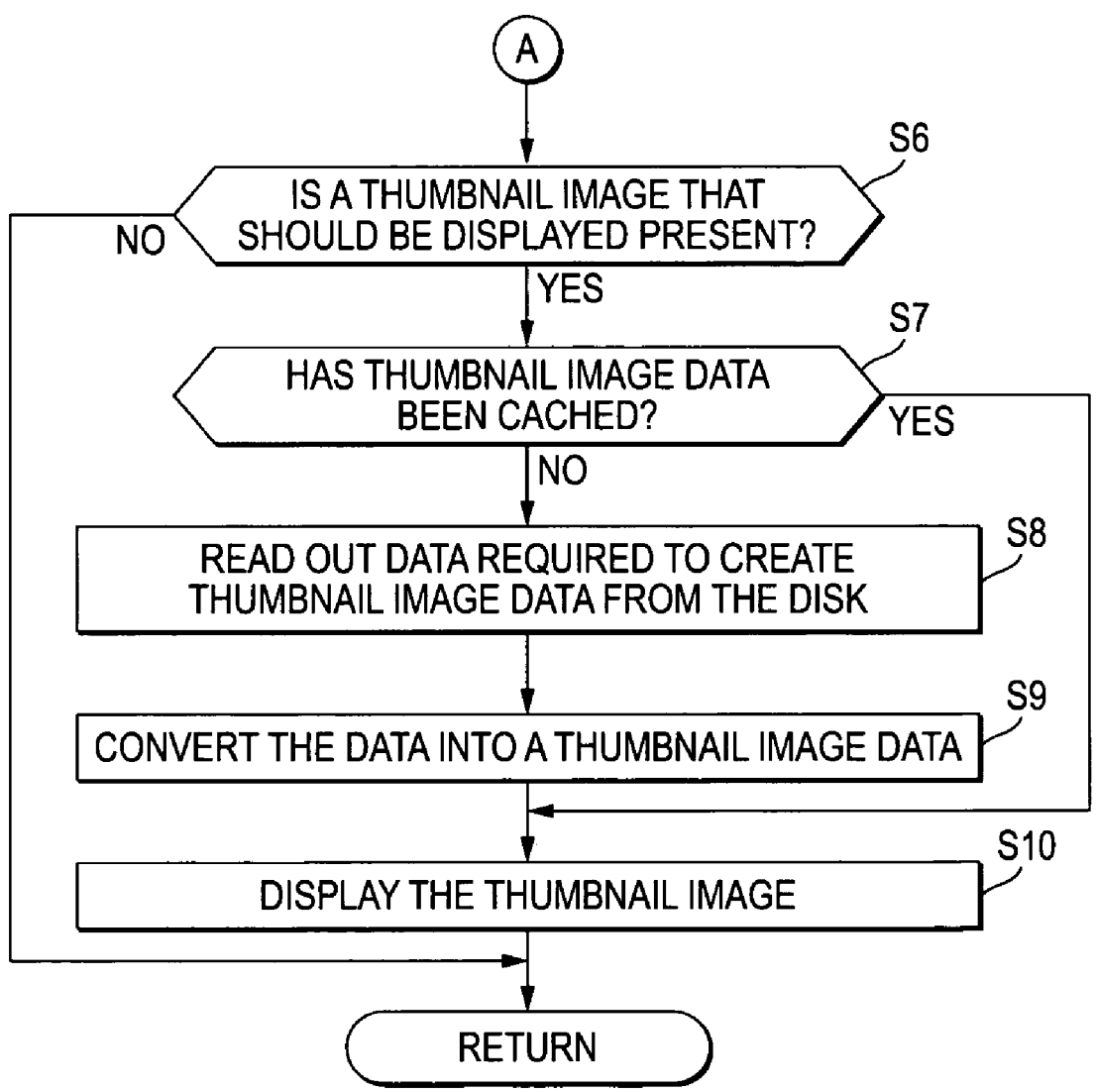
FIG. 2 is a flow chart of assistance in explaining an example of the conventional recording process.
Figure 3:
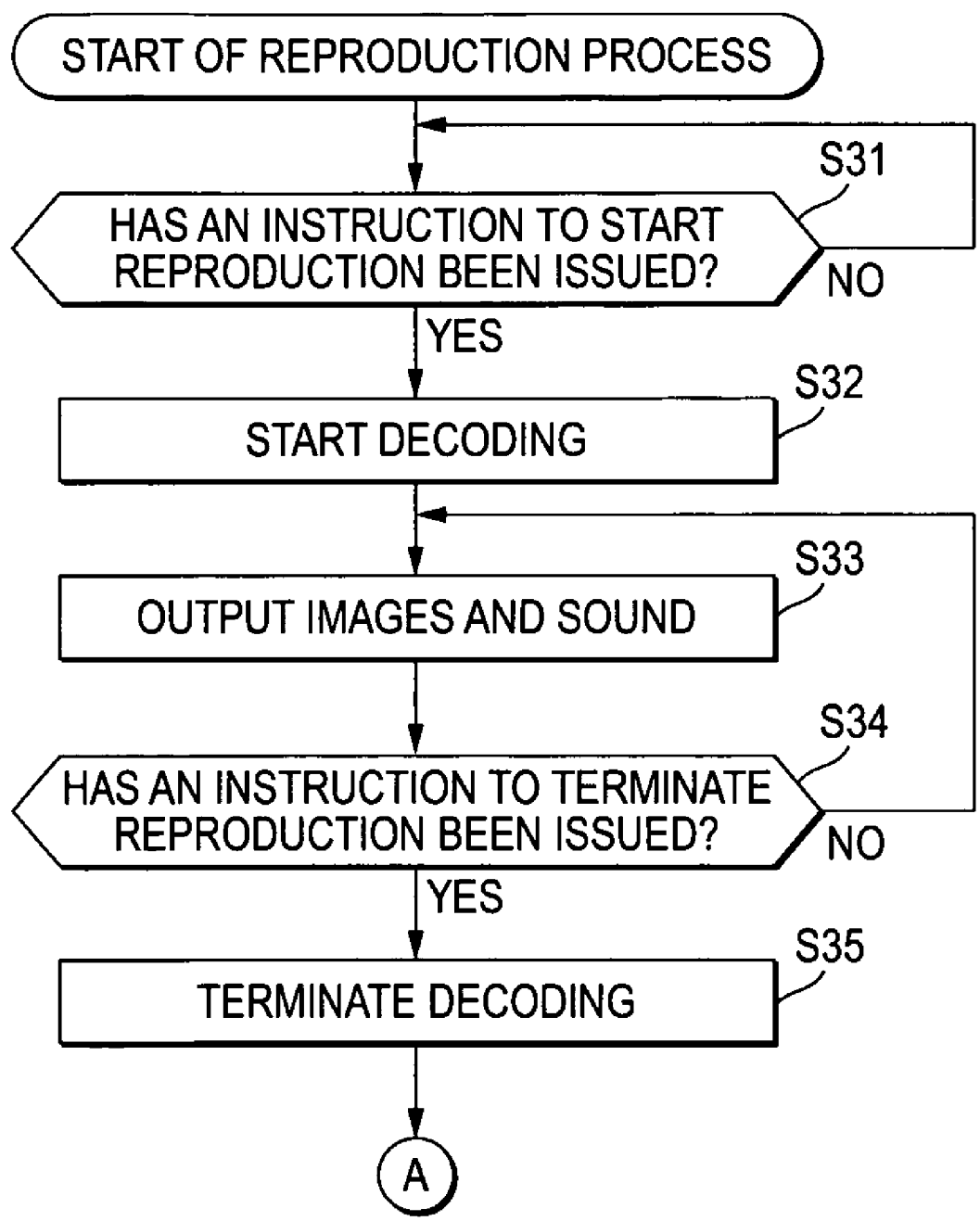
FIG. 3 is a flow chart of assistance in explaining an example of a conventional reproduction process.
Figure 4:
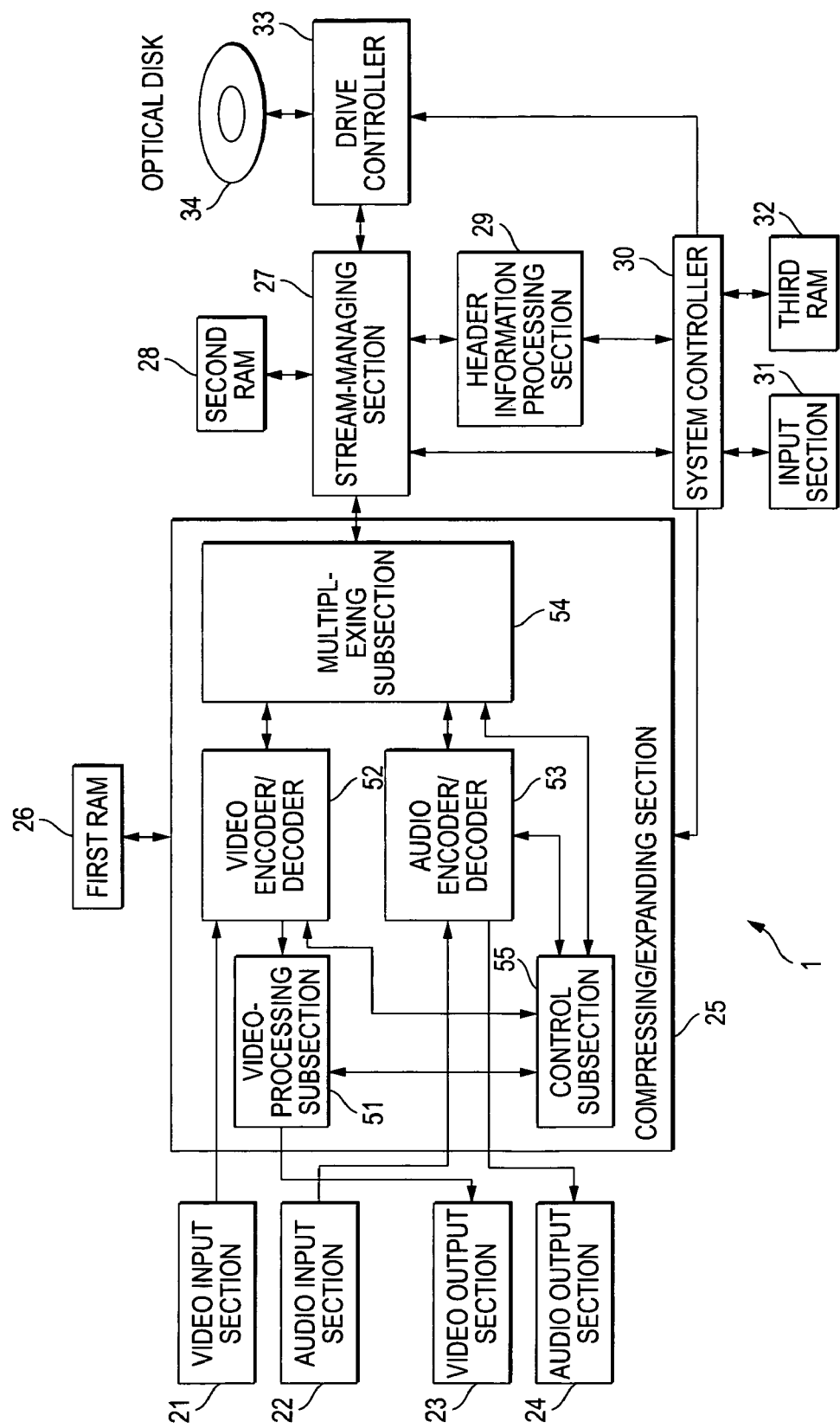
FIG. 4 is a block diagram showing an example of the arrangement of a playback device according to an embodiment of the invention.

The recorder stated in claim 1 is operable to compress and code first image data of a moving image, and record the compressed and coded first image data on a data recording medium, and includes: an extracting mechanism (e.g. the video encoder/decoder 52 or stream-managing section 27 in FIG. 4) operable to extract second image data to display a still image from the first image data of the moving image to be recorded on the data recording medium; a creating mechanism (e.g. the video-processing subsection 51 in FIG. 4) operable to create thumbnail image data to display a thumbnail image as an image smaller than the still image from the extracted second image data; and a storage-controlling mechanism (e.g. the control subsection 55 in FIG. 4) operable to control a temporary storage of the created thumbnail image data.

The recorder stated in claim 2 may further include a display-controlling mechanism (e.g. the compressing/expanding section 25 in FIG. 4) operable to control display of the thumbnail image based on the temporarily stored thumbnail image data.

The recorder stated in claim 3 may further include a record-controlling mechanism (e.g. the drive controller 33 in FIG. 4) operable to control recording of the temporarily stored thumbnail image data on the data recording medium.

The recorder stated in claim 4 may be arranged so that the extracting mechanism (e.g. the video encoder/decoder 52 in FIG. 4) extracts the second image data from the compressed and coded first image data of the moving image.

The recorder stated in claim 5 may be arranged so that the extracting mechanism (e.g. the stream-managing section 27 in FIG. 4) extracts the second image data from the compressed and coded, and multiplexed first image data of the moving image.

Figure 7:
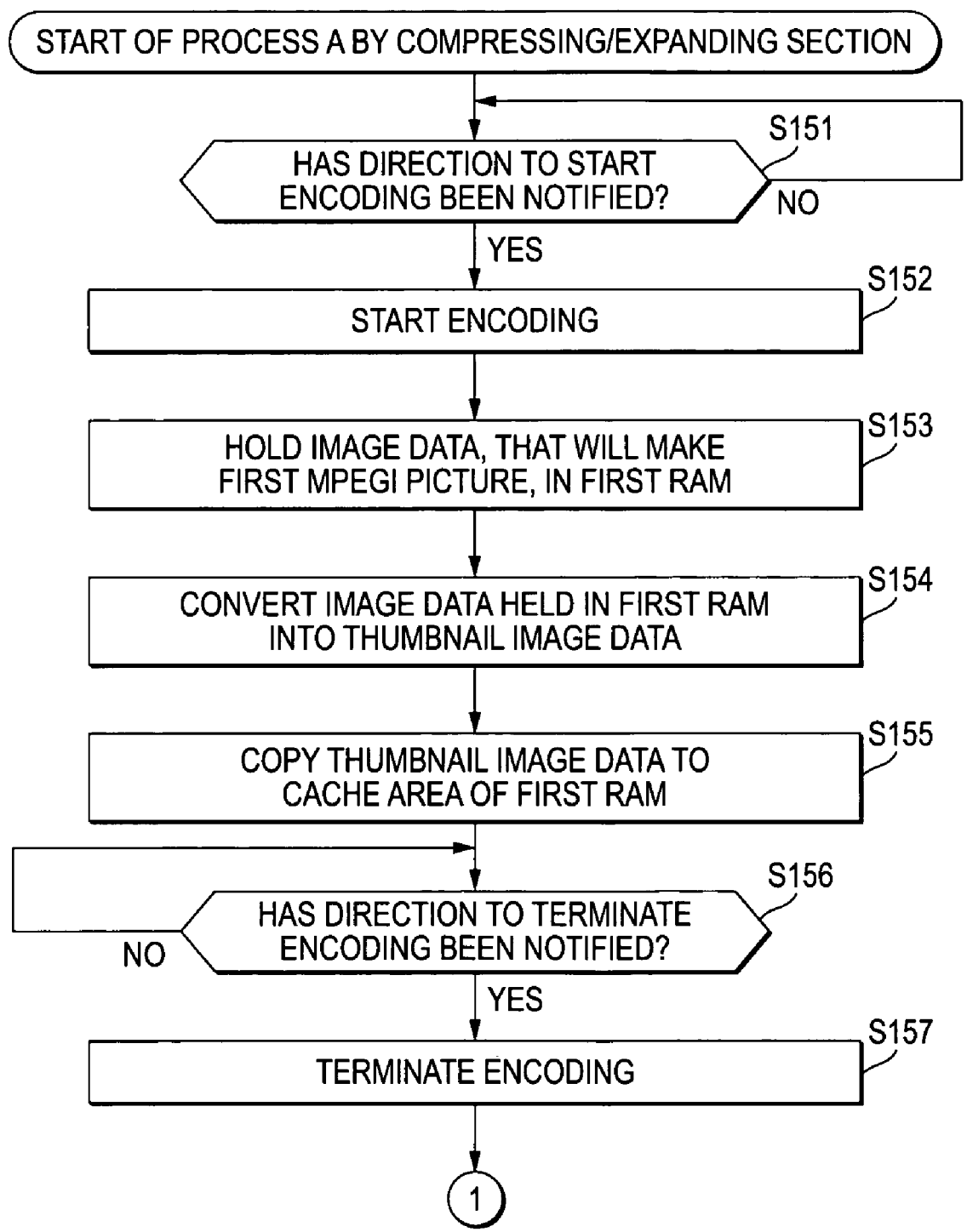
FIG. 7 is a flow chart of assistance in explaining a process A by the compressing/expanding section.

The recording method stated in claim 6 is a method to compress and code first image data of a moving image and record the compressed and coded first image data on a data recording medium, which includes the steps of: extracting second image data to display a still image from the first image data of the moving image to be recorded on the data recording medium (e.g. the process at Step S153 in FIG. 7); creating thumbnail image data to display a thumbnail image as an image smaller than the still image from the extracted second image data (e.g. the process at Step S154 in FIG. 7); and controlling a temporary storage of the created thumbnail image data (e.g. the process at Step S155 in FIG. 7).

The player stated in claim 9, which is operable to read out compressed and coded first image data of a moving image from a data recording medium and reproduce the moving image from the read first image data, includes: an extracting mechanism (e.g. the video encoder/decoder 52 or stream-managing section 27 in FIG. 4) operable to extract second image data to display a still image from the first image data read out from the data recording medium to reproduce the moving image; a creating mechanism (e.g. the video-processing subsection 51 in FIG. 4) operable to create thumbnail image data to display a thumbnail image as an image smaller than the still image from the extracted second image data; and a storage-controlling mechanism (e.g. the control subsection 55 in FIG. 4) operable to control a temporary storage of the created thumbnail image data.

The player stated in claim 10 may further include a display-controlling mechanism (e.g. the compressing/expanding section 25 in FIG. 4) operable to control display of the thumbnail image based on the temporarily stored thumbnail image data.

The player stated in claim 11 may further include a record-controlling mechanism (e.g. the drive controller 33 in FIG. 4) operable to control recording of the temporarily stored thumbnail image data on the data recording medium.

The player stated in claim 12 may be arranged so that the extracting mechanism (e.g. the stream-managing section 27 in FIG. 4) extracts the second image data from the multiplexed first image data of the moving image.

The player stated in claim 13 may be arranged so that the extracting mechanism (e.g. the video encoder/decoder 52 in FIG. 4) extracts the second image data from the multiplexed first image data of the moving image separated from multiplexed data.

Figure 16:
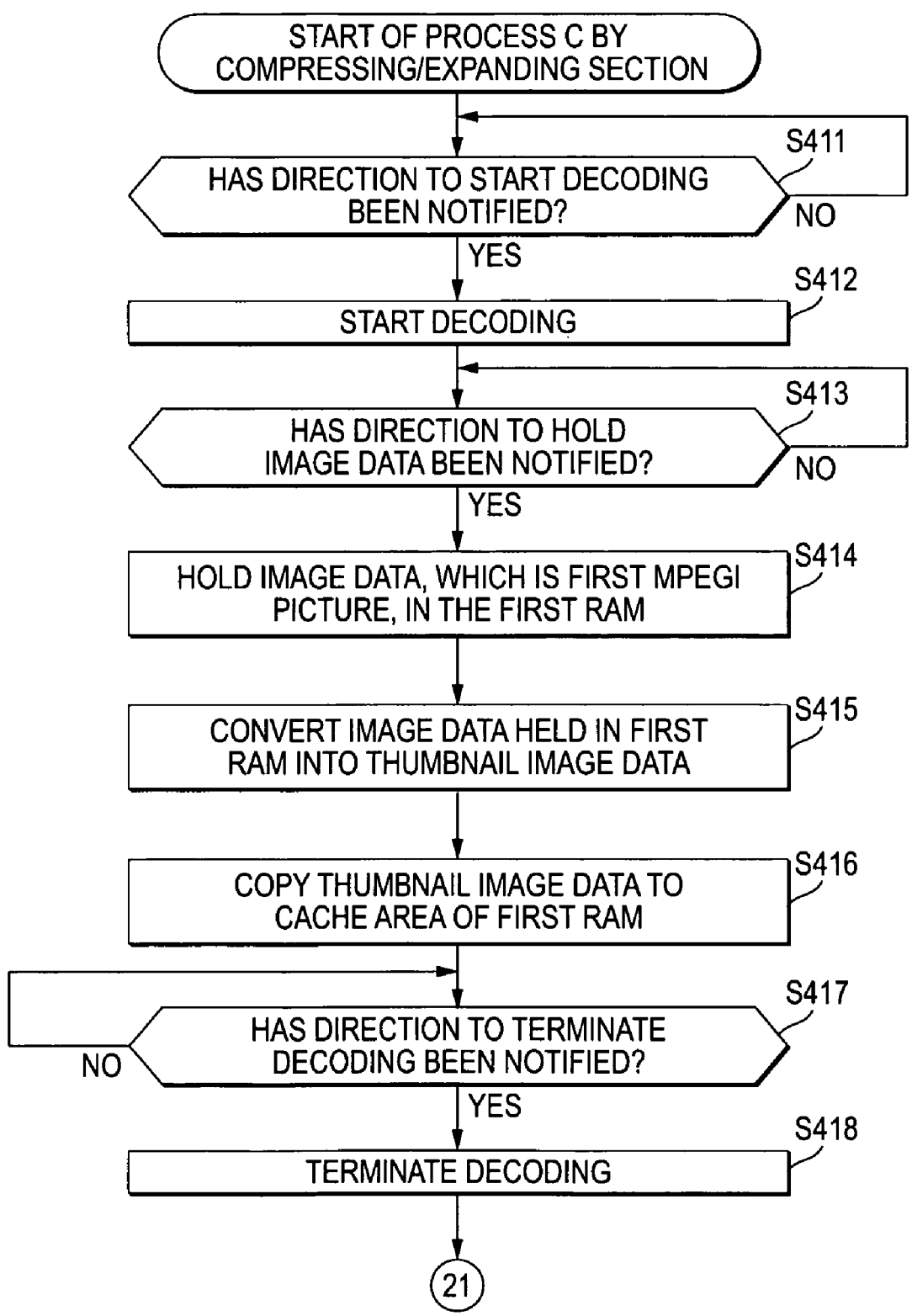
FIG. 16 is a flow chart of assistance in explaining a process C by the compressing/expanding section.

The reproducing method stated in claim 14 is a method to read out compressed and coded first image data of a moving image from a data recording medium and reproduce the moving image from the read first image data, which includes the steps of: extracting second image data to display a still image from the first image data read out from the data recording medium to reproduce the moving image (e.g. the process at Step S414 in FIG. 16); creating thumbnail image data to display a thumbnail image as an image smaller than the still image from the extracted second image data (e.g. the process at Step S415 in FIG. 16); and controlling a temporary storage of the created thumbnail image data (e.g. the process at Step S416 in FIG. 16).

The embodiments of the invention will be described below with reference to the drawings. FIG. 4 is a block diagram showing the arrangement of a playback device 1 according to an embodiment of the invention.

The playback device 1 is a digital video camera, a stay-at-home recorder/player or the like. The playback device 1: acquires an image or sound as data based on a user operation (instruction) input through e.g. an input portion 31; records the data on an optical disk 34, namely a recording medium constituted by e.g. a DVD (Digital Versatile Disk); and reproduces and outputs image/sound data recorded on the optical disk 34. After the recording of data is terminated, the playback device 1 displays as a thumbnail image a representative of one or more images placed therein, which is referred to as e.g. title or chapter, for each image recording unit of image/sound data. Likewise, after the reproduction of data, the playback device 1 displays a page of a thumbnail list (containing a recording unit at the time of stopping the reproduction) for each reproduced recording unit.

In the drawing, the video input section 21 includes, for example, an optical system such as a lens, and an imaging element such as a CCD (Charge Coupled Device) or a CMOS (Complementary Metal-Oxide Semiconductor) sensor, and creates image data of an image taken by shooting a picture image of an object. In addition, the video input section 21 converts a video signal supplied from e.g. another video camera or an input signal (video signal) coming from an external apparatus into digital data thereby to create digital video data (image data). The resultant image data is supplied to the compressing/expanding section 25.

The audio input section 22 includes, for example, a microphone, and acquires sound and creates sound data of the acquired sound. Also, the audio input section 22 converts a sound signal supplied from e.g. another video camera, an external microphone or the like or an input signal (sound signal) coming from an external apparatus into digital data thereby to create audio data (sound data). The resultant sound data is also supplied to the compressing/expanding section 25.

The video output section 23 is an LCD (Liquid Crystal Display), a viewfinder incorporating an LCD or the like, and displays a moving image or a thumbnail image based on image data supplied from the compressing/expanding section 25. Also, the video output section 23 converts image data supplied from the compressing/expanding section 25 into analog signals or digital signals for output, and outputs the resultant signals to an apparatus including video display means such as a display.

The audio output section 24 is a speaker or the like, and outputs sound based on sound data supplied from the compressing/expanding section 25. Also, the audio output section 24 converts sound data supplied from the compressing/expanding section 25 into analog signals or digital signals for output, and outputs the signals to an apparatus including audio output means such as a speaker.

The sections of the video input section 21 to audio output section 24 execute the above-described processes under the control of the system controller 30.

The compressing/expanding section 25 is so arranged that it can switch between two working modes, i.e. a recording mode of recording an input image/sound on the optical disk 34 and a play mode of reproducing an image/sound recorded on the optical disk 34, under the control of the system controller 30. In recording (working in the recording mode), the video encoder/decoder 52 and the audio encoder/decoder 53 in the compressing/expanding section 25 respectively use the first RAM (Random Access Memory) 26 and encode image and sound data (i.e. compress and code those data according to a given method), and the multiplexing subsection 54 in the compressing/expanding section 25 carries out the time division multiplexing on the encoded image and sound data and outputs the results to the stream-managing section 27.

In reproduction (working in the play mode), the multiplexing subsection 54 in the compressing/expanding section 25 uses the first RAM 26 to separate data acquired from the stream-managing section 27, which has been subjected to time division multiplexing, into image data and sound data. Then, the video encoder/decoder 52 and the audio encoder/decoder 53 in the compressing/expanding section 25 decode (or decrypt according a given method) the image data and the sound data respectively, and output the resultant data to the video-processing subsection 51 and the audio output section 24 respectively.

The video-processing subsection 51 combines a character, a thumbnail image, etc. with image data to output the combination thereof to the video output section 23. Also, the video-processing subsection 51 performs conversion of image data into thumbnail image data. The video-processing subsection 51 uses a preset region of the first RAM 26 as a cache area to temporarily hold thumbnail image data for the purpose of displaying a thumbnail image at a higher speed.

The first RAM 26 is composed of a writable and readable semiconductor memory, and is capable of temporarily storing image data or sound data, which are to be encoded or to be decoded.

The control subsection 55 controls the subsections that constitute the compressing/expanding section 25.

In recording, the header information processing section 29 adds, for example, header information unique to each DVD to the time division multiplexed data output from the stream-managing section 27, and then outputs the resultant time division multiplexed data with the header information attached thereto to the stream-managing section 27. In reproduction, the header information processing section 29 separates header information unique to a DVD from time division multiplexed data output from the stream-managing section 27, and outputs the resultant time division multiplexed data, which has header information separated therefrom, to the stream-managing section 27. In addition, the header information processing section 29 outputs the separated header information to the system controller 30.

In recording, the stream-managing section 27 receives time division multiplexed data from the compressing/expanding section 25 and transmits the received data to the header information processing section 29. Then, the stream-managing section 27 receives time division multiplexed data with e.g. header information unique to a DVD attached thereto from the header information processing section 29, and stores the data in the second RAM 28. When receiving a direction to write data on the optical disk 34 under the control of the system controller 30, the stream-managing section 27 transmits the time division multiplexed data, which has been stored in the second RAM 28, to the drive controller 33.

In reproduction, the stream-managing section 27 receives time division multiplexed data from the drive controller 33, and transmits the time division multiplexed data to the header information processing section 29. Then, the stream-managing section 27 receives, for example, time division multiplexed data, which has DVD header information separated therefrom, from the header information processing section 29 and stores the data in the second RAM 28. The stream-managing section 27 outputs time division multiplexed data stored in the second RAM 28 to the compressing/expanding section 25 under the control of the system controller 30 at the time when the compressing/expanding section 25 needs the time division multiplexed data.

The second RAM 28 is composed of a writable and readable semiconductor memory, and is capable of temporarily storing data to be written on the optical disk 34 or data read out from the optical disk 34.

The system controller 30 controls constituent elements that constitute the playback device 1. The system controller 30 controls the compressing/expanding section 25, the stream-managing section 27, the header information processing section 29, the drive controller 33, etc. so that the start and stop of reproducing a record can be realized in response to a request (instruction) from a user, which the controller accepts through the input section 31, and it uses the third RAM 32 as a work memory as required.

The input section 31 includes a switch, a touch panel or the like, and serves to supply a signal in response to a user operation to the system controller 30.

Under the control of the system controller 30, the drive controller 33 makes a drive, which is not shown in the drawing, record time division multiplexed data supplied from the stream-managing section 27 on the optical disk 34 and read out time division multiplexed data recorded on the optical disk 34, and supplies the read data to the stream-managing section 27.

Now, the recording process (1), an example of the data-recording process by the playback device 1, will be described with reference to the flow chart of FIG. 5.

At Step S101, the system controller 30 judges based on a user operation (instruction) input through the input section 31 whether or not an instruction to start recording of image/sound data has been issued. The system controller waits until it is judged that an instruction to start the recording has been issued. When it is judged at Step S101 that an instruction to start the recording has been issued, the process proceeds to Step S102.

At Step S102, the system controller 30 notifies the compressing/expanding section 25 of an instruction to start encoding.

The instruction to start encoding, which the system controller 30 notifies to the compressing/expanding section 25 at Step S102, is accompanied with a parameter to give a direction to store a first MPEG (Moving Picture Experts Group) I (IntraCoded) picture, of data to be recorded. Thus, the video encoder/decoder 52 and the audio encoder/decoder 53 in the compressing/expanding section 25 respectively use the first RAM 26 to start encoding of image data and sound data of a moving image. The works of the compressing/expanding section 25 at this time will be described later in detail. At Step S102, the system controller 30 controls the drive controller 33 and makes the drive controller 33 start recording encoded and time division multiplexed data on the optical disk 34, provided that the data is output from the stream-managing section 27.

At Step S103, the system controller 30 judges based on a user operation (instruction) input through the input section 31 whether or not an instruction to terminate recording of image/sound data has been issued. The system controller 30 waits until it is judged that an instruction to terminate the recording has been issued. When it is judged at Step S103 that an instruction to terminate the recording has been issued, the process proceeds to Step S104.

At Step S104, the system controller 30 notifies the compressing/expanding section 25 of a direction to terminate the encoding. Thus, the video encoder/decoder 52 and audio encoder/decoder 53 in the compressing/expanding section 25 terminate the encoding of image data and sound data respectively.

At Step S105, the system controller 30 controls the drive controller 33, and makes the drive controller write all the data stored in the second RAM 28 used as a buffer on the optical disk 34 and then execute a process to terminate recording such as writing information required for reproduction into the header of the recorded data.

By the processes at Steps S101 to S105, data as a chapter is recorded on the optical disk 34.

When writing of the time division multiplexed data on the optical disk 34 is terminated, the system controller 30 executes a process to display a thumbnail image, which will be described later with reference to FIG. 6 at Step S106, and then terminates the process. Thus, a representative image of video (image) data recorded on the optical disk 34 through the process at Step S105 is displayed as a thumbnail image.

Now, details of the process to display a thumbnail image at Step S106 shown in FIG. 5 will be described with reference to the flow chart of FIG. 6.

At Step S121, the system controller 30 judges based on the condition (i.e. mode or status) of the playback device 1 that the controller holds or a signal coming from the input section 31 whether or not a thumbnail image that should be displayed is present. When it is judged that a thumbnail image that should be displayed is present, the process proceeds to Step S122.

At Step S122, the system controller 30 judges based on a signal showing the result of the processing supplied from the compressing/expanding section 25 or a signal showing the data stored in the first RAM 26 whether or not data of a thumbnail image has been cached (or stored in a cache area of the first RAM 26). When it is judged that any thumbnail image data has not been cached, the process proceeds to Step S123. When it is judged that thumbnail image data has been cached, the process proceeds to Step S125 (Steps S123 and S124 are skipped). The process to cache thumbnail image data is performed by the compressing/expanding section 25, and the detail thereof will be described later with reference to FIG. 7.

At Step S123, the system controller 30 controls the drive controller 33, makes the drive controller read out the data (image data) required to create thumbnail image data from the optical disk 34, and has the read data held (stored) in the first RAM 26. Further at Step S124, based on the data read out through the process in Step S123, the system controller 30 notifies a direction for conversion to thumbnail image data to the compressing/expanding section 25 so as to create thumbnail image data. Thus, the video-processing subsection 51 in the compressing/expanding section 25 creates the thumbnail image data. The resultant thumbnail image data is cached in a given region (cache area) of the first RAM 26.

In the case where no thumbnail image data is cached, the process to create thumbnail image data is required newly, and therefore the processes at Steps S123 and S124 are executed.

In contrast, in the case where thumbnail image data has been cached, the process to create thumbnail image data newly is unnecessary, and therefore the processes at Steps S123 and S124 are skipped. In this way, it can be made possible to shorten the time spent on the process to display a thumbnail image.

At Step S125, the system controller 30 notifies a direction to display a thumbnail image to the compressing/expanding section 25, and then the process is terminated. Thus, based on the thumbnail image data, the compressing/expanding section 25 makes the video output section 23 display a thumbnail image (to a user).

When it is judged at Step S121 that there is no thumbnail image that should be displayed, the process is terminated without displaying a thumbnail image.

Now, the process A by the compressing/expanding section, a process that the compressing/expanding section 25 executes according to the recording process (1) described with reference to FIGS. 5 and 6, will be described with reference to the flow charts of FIGS. 7 and 8.

At Step S151, the control subsection 55 in the compressing/expanding section 25 judges whether or not a direction to start encoding has been notified from the system controller 30. The control subsection 55 waits until it is judged that a direction to start encoding has been notified.

Figure 5:
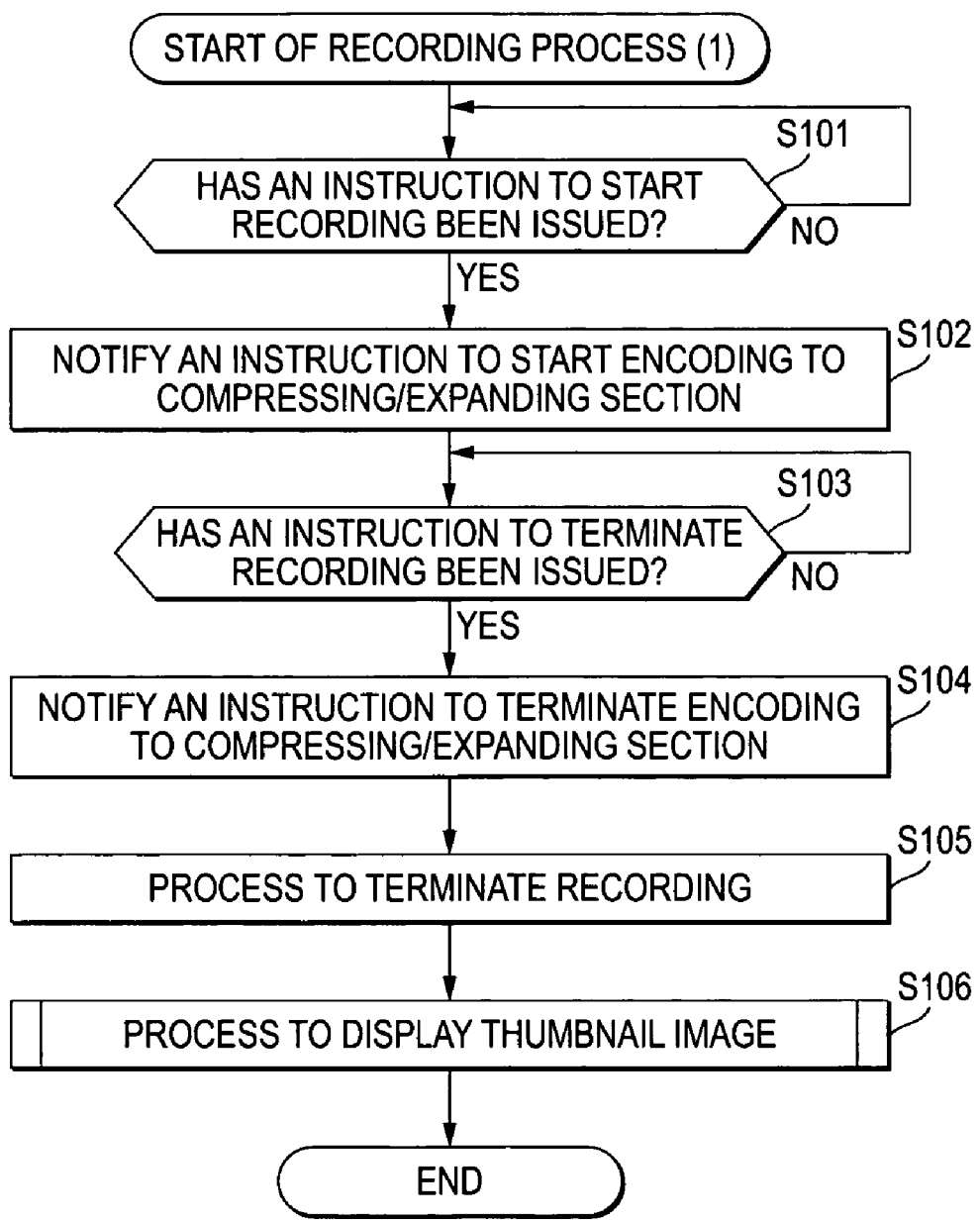
FIG. 5 is a flow chart of assistance in explaining a recording process (1)

When the system controller 30 has notified a direction to start encoding to the compressing/expanding section 25 according to the process at Step S102 in FIG. 5, it is judged at Step S151 that a direction to start encoding has been notified, and then the process proceeds to Step S152.

At Step S152, the control subsection 55 controls the video encoder/decoder 52 and the audio encoder/decoder 53, and makes them start the encoding of the input image data and sound data respectively.

At Step S153, the control subsection 55 makes the video encoder/decoder 52 hold (store) the image data of data to be recorded, as a first MPEG I picture, in the first RAM 26 based on a parameter supplied from the system controller 30 together with an instruction to start encoding. Here, the image data making a first MPEG I picture is held to create a thumbnail image.

Specifically, the video encoder/decoder 52 extracts image data of one frame from image data of an input moving image. In other words, the video encoder/decoder 52 extracts the image data to display a still image from image data of a moving image to be recorded on the optical disk 34. The video encoder/decoder 52 stores the extracted image data in the first RAM 26.

In more detail, the video encoder/decoder 52 may extract the image data to display a still image from image data before being encoded (coded) that are image data of a moving image to be recorded on the optical disk 34. Alternatively, the video encoder/decoder 52 may extract image data to display a still image from encoded (coded) image data that are image data of a moving image to be recorded on the optical disk 34.

In the case where image data to display a still image is extracted from image data before being encoded (coded), decryption or the like is not required for the subsequent process and as such, the process can be made simpler. Further, in the case where image data to display a still image is extracted from encoded (coded) image data, the data amount of the extracted image data is made smaller and as such, the data can be stored in a smaller storage region of the first RAM 26.

The image data used to create a thumbnail image is not limited to the image data making a first MPEG I picture, of data to be recorded, and it may be set appropriately. For example, in the case of recording, when a thumbnail button of the input section 31 is pushed, the control subsection 55 may have the image data making a first MPEG I picture stored in the first RAM 26 after the thumbnail button is pushed.

At Step S154, the control subsection 55 controls the video-processing subsection 51 and makes the video-processing subsection 51 convert the image data held in the first RAM 26 at Step S153 into a thumbnail image. For example, at Step S154 the video-processing subsection 51 thins out picture elements from image data stored in the first RAM 26 thereby to convert the image data into thumbnail image data.

In other words, at Step S154 the video-processing subsection 51 creates thumbnail image data from the image data extracted and stored in the first RAM 26. The thumbnail image data is a piece of data to display a thumbnail image that is a smaller image in comparison to a still image displayed with extracted image data.

The thumbnail image data may be uncompressed or compressed by JPEG (Joint Photographic Experts Group) or GIF (Graphics Interchange Format) or the like. Conversion into uncompressed thumbnail image data eliminates the needs for decryption in displaying a thumbnail image, and thus a thumbnail image can be displayed more rapidly. In addition, conversion into compressed thumbnail image data can reduce thumbnail image data in data amount and as such, it becomes possible to store a larger amount of thumbnail image data in a cache area even with the same storage capacity.

At Step S155, the control subsection 55 copies/puts thumbnail image data subjected to the conversion at Step S154 to/in a given preset cache area of the first RAM 26.

In other words, at Step S155 the control subsection 55 controls temporary storage of thumbnail image data in the first RAM 26.

Now, it is noted that Steps S153 to S155 are executed in parallel with encoding of image data of a moving image.

At Step S156, the control subsection 55 judges whether or not a direction to terminate encoding has been notified from the system controller 30. When it is judged that a direction to terminate encoding has not been notified yet, the video encoder/decoder 52 and the audio encoder/decoder 53 continue encoding input image data and sound data. The process is returned to Step S156, and the judgment is repeated until it is judged that a direction to terminate encoding has been notified.

When the system controller 30 has notified a direction to terminate encoding to the compressing/expanding section 25 according to the process at Step S104 in FIG. 5, it is judged at Step S156 that a direction to terminate encoding has been notified and then the process proceeds to Step S157.

At Step S157, the control subsection 55 makes the video encoder/decoder 52 and the audio encoder/decoder 53 terminate encoding.

At Step S158, the control subsection 55 judges whether or not a direction for conversion to thumbnail image data has been notified from the system controller 30. When it is judged that a direction for conversion to thumbnail image data has been notified, the process proceeds to Step S159. When it is judged that a direction for conversion to thumbnail image data has not been notified, the process proceeds to Step S161 (i.e. Steps S159 and S160 are skipped).

Figure 6:
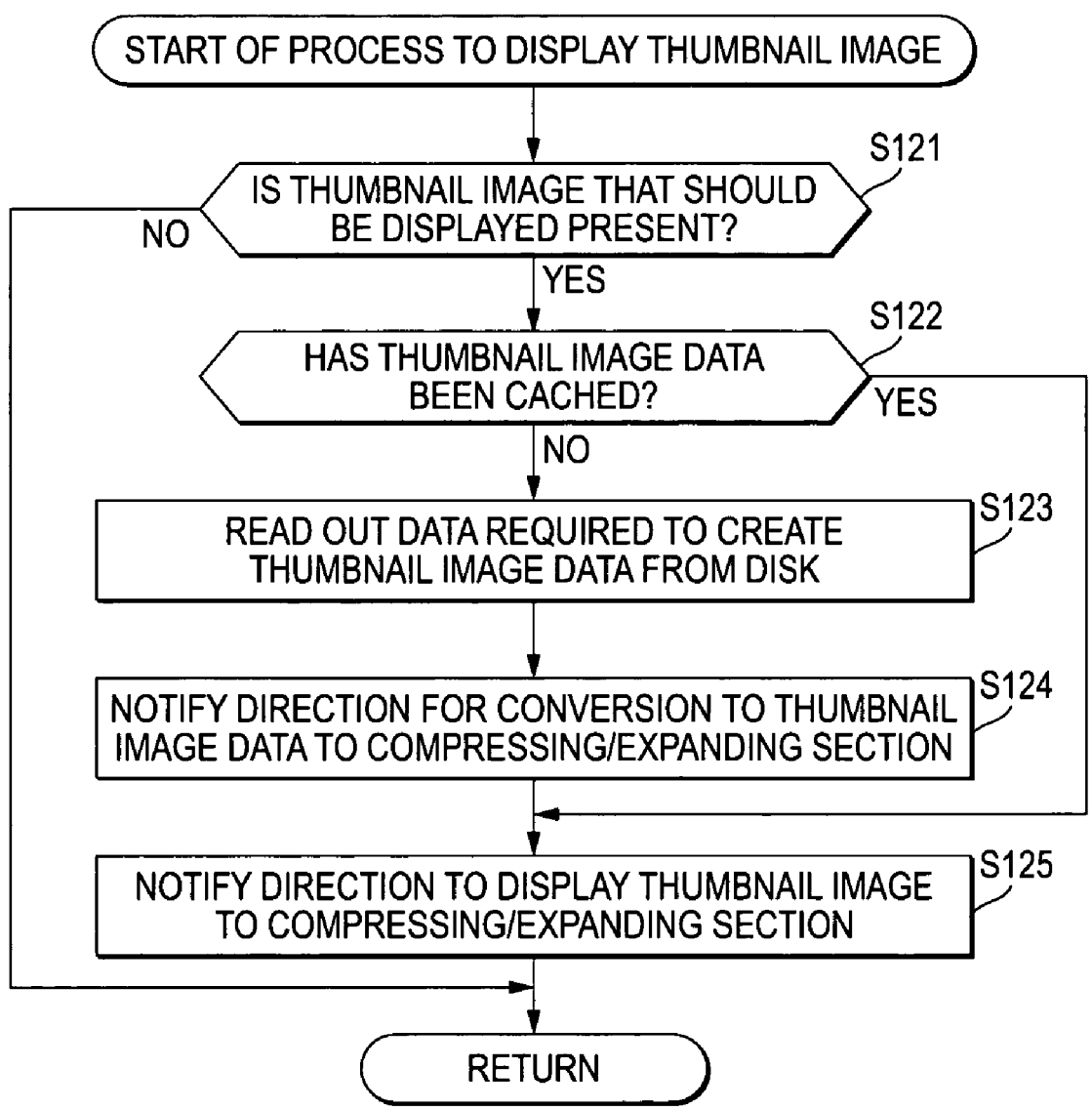
FIG. 6 is a flow chart of assistance in explaining a process to display a thumbnail.

When the system controller 30 has notified a direction for conversion to thumbnail image data to the compressing/expanding section 25 according to the process at Step S124 in FIG. 6, it is judged at Step S158 that a direction for conversion to thumbnail image data has been notified, and then the process proceeds to Step S159.

At Step S159, the control subsection 55 controls the video-processing subsection 51, and makes it convert the image data, which has been read out from the optical disk 34 at Step S123 and held by the first RAM 26, into thumbnail image data. At Step S160, the control subsection 55 copies/puts the thumbnail image data resulting from the conversion at Step S159 (created at Step S159) to/in a cache area of the first RAM 26.

When thumbnail image data has been cached in the processes at Steps S154 and S155, it is not required to create thumbnail image data newly and as such, Steps S159 and S160 are skipped. This can shorten the time required to display a thumbnail image.

In the case where it is required to display a thumbnail image that is not cached for some reason, Steps S159 and S160 are executed to newly create thumbnail image data when the above-described processes at Steps 123 and S124 in FIG. 6 are carried out.

At Step S161, the control subsection 55 judges whether or not a direction to display a thumbnail image has been notified from the system controller 30. The control subsection 55 waits until it is judged that a direction to display a thumbnail image has been notified.

When the system controller 30 has notified a direction to display a thumbnail image to the compressing/expanding section 25 according to the process at Step S125 in FIG. 6, it is judged at Step S161 that a direction to display a thumbnail image has been notified, and then the process proceeds to Step S162.

At Step S162, the control subsection 55 reads out thumbnail image data from the cache area of the first RAM 26, and outputs the data to video output section 23. Then, the thumbnail image is displayed, and the process is terminated. Thus, the thumbnail image is displayed, for example, by the video output section 23 itself, or displayed by a display device connected to the video output section 23.

In this way, thumbnail image data recorded on the optical disk 34 can be displayed immediately after the termination of the recording process.

It has been described above that a series of the processes of extracting image data of a still image from image data of a moving image, creating thumbnail image data from the extracted image data, and caching the created thumbnail image data is carried out in parallel with the process of encoding the image data of the moving image (the process of recording on the optical disk 34). However, the processes may be executed according to the following procedure: extracting image data of a still image from image data of a moving image in parallel with encoding image data of the moving image (the process of recording on the optical disk 34); and after the process of recording image data of the moving image on the optical disk 34 has been terminated, creating thumbnail image data and caching the created thumbnail image data.

Also, in the case of creating two or more chapters during a time interval between the start and stop of the recording, the compressing/expanding section 25 may make the first RAM 26 store an arbitrary MPEG I picture in connection with each chapter, create thumbnail image data based on the stored MPEG I picture, and cache the created thumbnail image data in a cache area of the first RAM 26.

While in the above recording process (1) described with reference to FIG. 5, the compressing/expanding section 25 makes the first RAM 26 store (cache) the data required to create thumbnail image data, e.g. video data making a first MPEG I picture, of encoded image data, the stream-managing section 27 may be used to make the first RAM cache the data required to create a thumbnail, of time division multiplexed data output from the compressing/expanding section 25.

Now, the recording process (2), an example of the data-recording process by the playback device 1 in this case, will be described with reference to the flow chart of FIG. 9.

At Step S201, the system controller 30 judges based on a user operation (instruction) input through the input section 31 whether or not an instruction to start recording of image/sound data has been issued. The system controller waits until it is judged that an instruction to start the recording has been issued. When it is judged at Step S201 that an instruction to start the recording has been issued, the process proceeds to Step S202.

At Step S202, the system controller 30 notifies the compressing/expanding section 25 of a direction to start encoding. As a result of this, the video encoder/decoder 52 and the audio encoder/decoder 53 in the compressing/expanding section 25 start encoding of image data and sound data respectively, in which they use the first RAM 26. The workings of the compressing/expanding section 25 during this time will be described later in detail.

At Step S202, the system controller 30 controls the drive controller 33 and makes the controller 33 start the recording of encoded and time division multiplexed data, which is output from the stream-managing section 27, on the optical disk 34.

At Step S203, the system controller 30 controls the stream-managing section 27 and makes the stream-managing section 27 hold (or store) image data, which will make a first MPEG I picture, in the second RAM 28.

At Step S204, the system controller 30 uses the stream-managing section 27 and compressing/expanding section 25 to transfer the video data, which is held in the second RAM 28 according to the process at the Step S203, to the first RAM 26. Specifically, the stream-managing section 27 reads out image data stored in the second RAM 28 therefrom and supplies the read image data to the compressing/expanding section 25. The compressing/expanding section 25 stores the image data supplied from the stream-managing section 27 in the first RAM 26.

As the result of the processes at Steps S203 and S204, the data required to create thumbnail image data (image data making the first MPEG I picture in this case) will be stored in (cached in or held by) the first RAM 26 as in the case of the recording process (1). The image data used to create thumbnail image data is not limited to image data making the first MPEG I picture, and it may be set appropriately.

At Step S205, the system controller 30 judges based on a user operation (instruction) input through the input section 31 whether or not an instruction to terminate recording of image/sound data has been issued. The system controller 30 waits until it is judged that an instruction to terminate the recording has been issued. When it is judged at Step S205 that an instruction to terminate the recording has been issued, the process proceeds to Step S206.

The processes at Steps S206 to S208 are the same as those at Steps S104 to S106 in FIG. 5 and as such, their descriptions are omitted.

Figure 10:
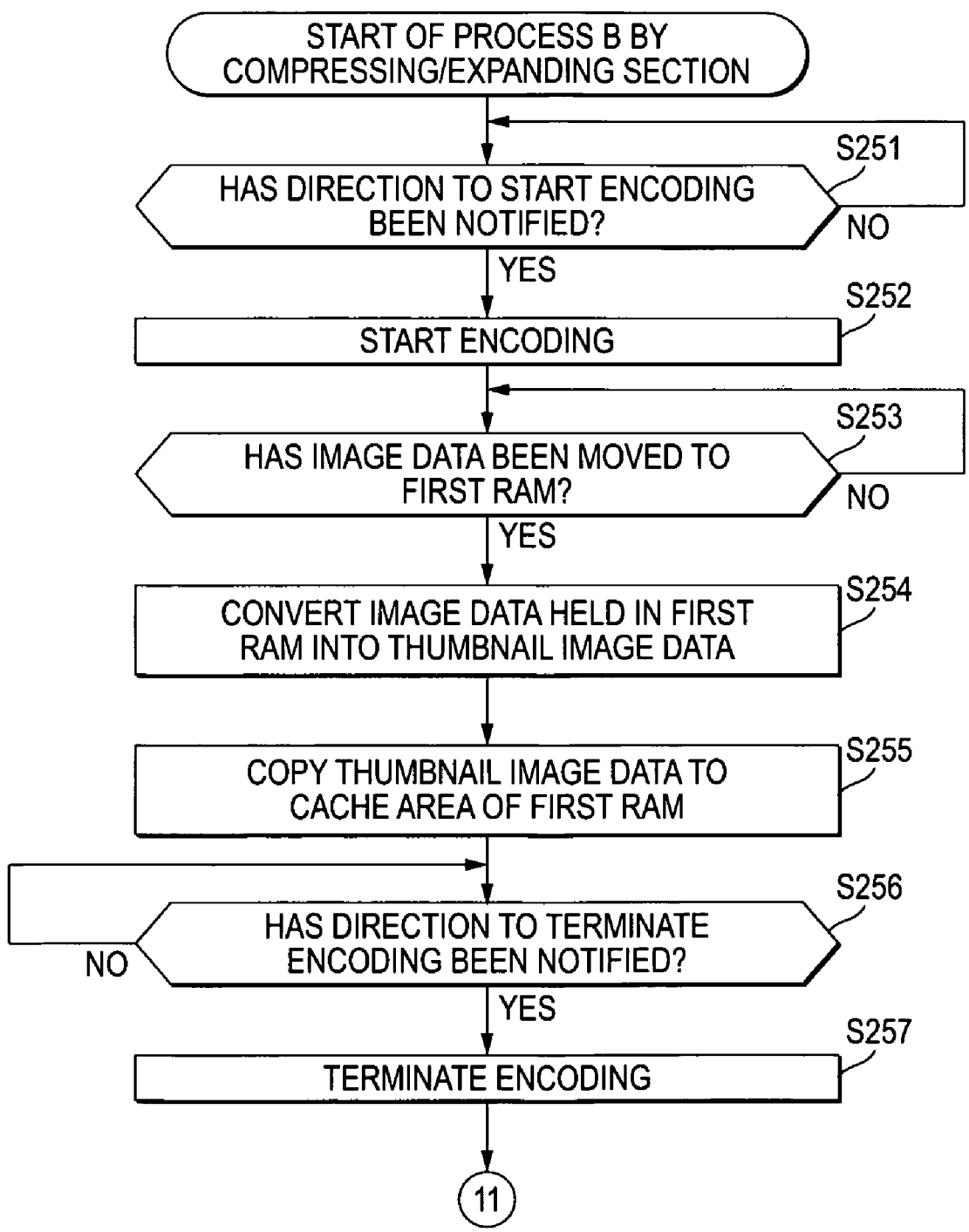
FIG. 10 is a flow chart of assistance in explaining a process B by the compressing/expanding section.
Figure 11:
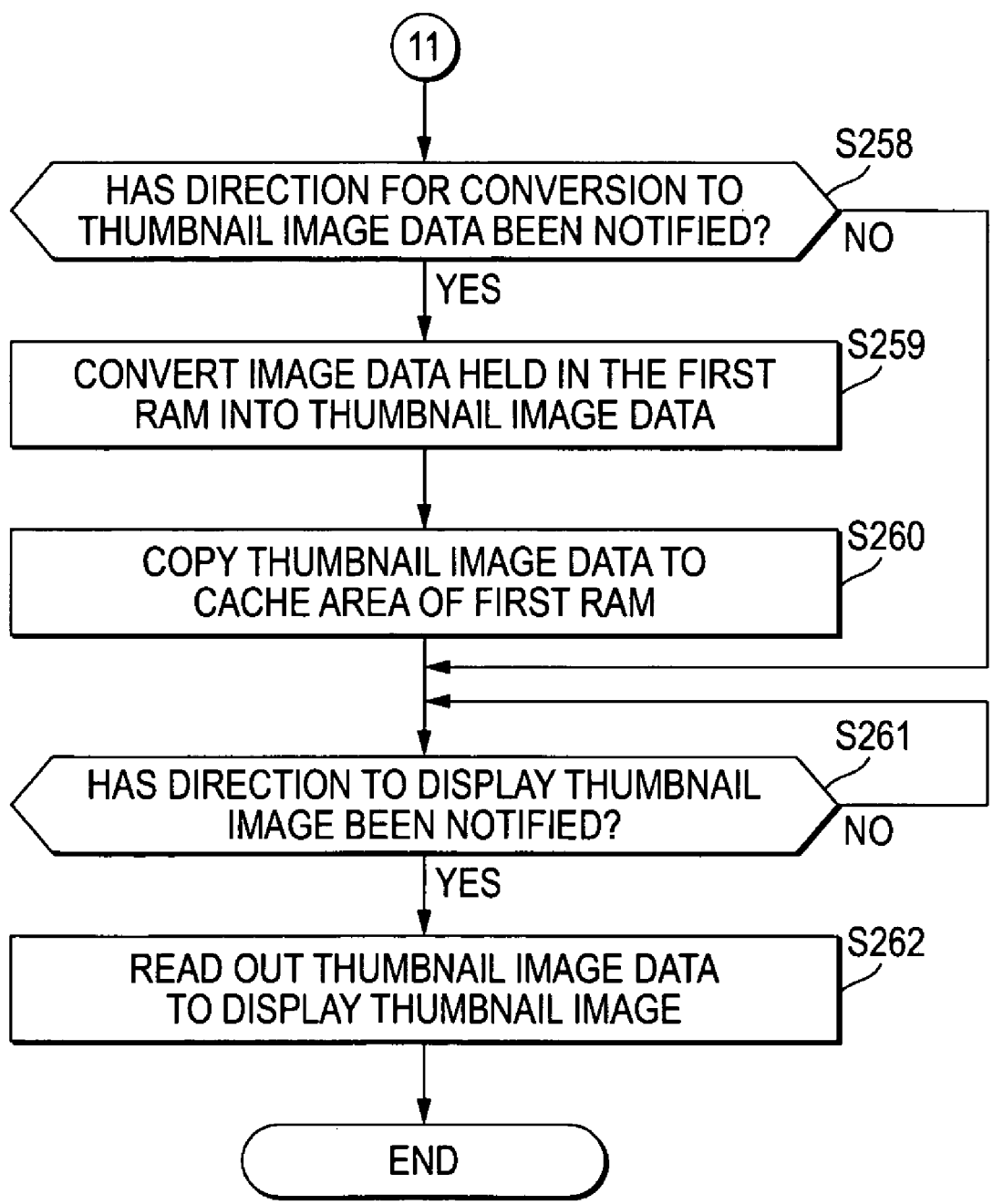
FIG. 11 is a flow-chart of assistance in explaining the process B by the compressing/expanding section.

Now, the process B by the compressing/expanding section, a process that the compressing/expanding section 25 executes according to the recording process (2) described with reference to FIG. 9, will be described with reference to flow charts of FIGS. 10 and 11.

At Step S251, the control subsection 55 in the compressing/expanding section 25 judges whether or not a direction to start encoding has been notified from the system controller 30. The control subsection 55 waits until it is judged that a direction to start encoding has been notified.

Figure 9:
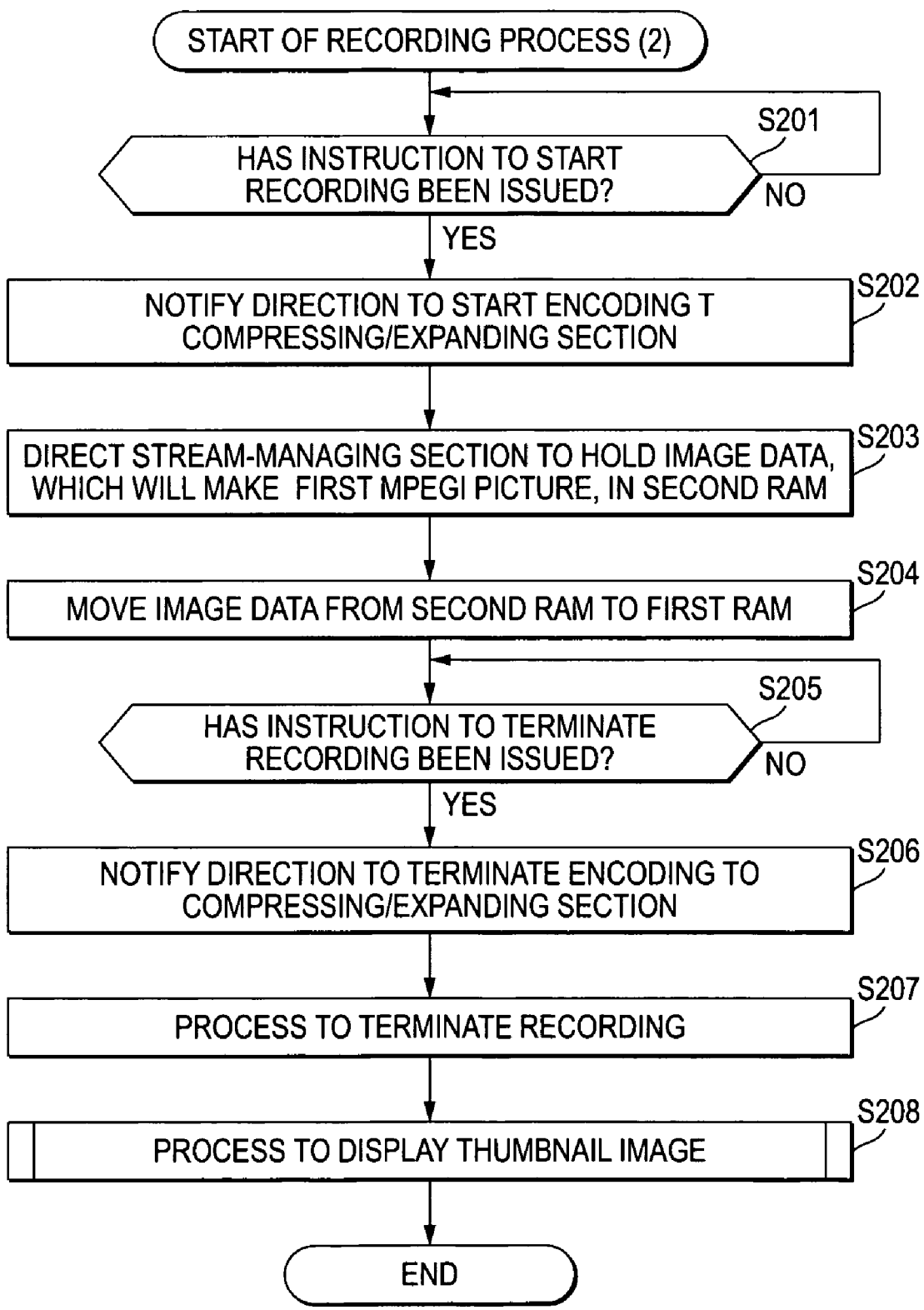
FIG. 9 is a flow chart of assistance in explaining a recording process (2)

When the system controller 30 has notified a direction to start encoding to the compressing/expanding section 25 according to the process at Step S202 in FIG. 9, it is judged at Step S251 that a direction to start encoding has been notified. Then, the process proceeds to Step S252.

At Step S252, the control subsection 55 controls the video encoder/decoder 52 and the audio encoder/decoder 53, and makes them start encoding of input image data and sound data respectively.

At Step S253, the control subsection 55 judges whether or not image data has been transferred from the second RAM 28 to the first RAM 26. When it is judged that image data has not been transferred to the first RAM 26, the process is returned to Step S253, and the judging process is repeated.

When image data has been transferred from the second RAM 28 to the first RAM 26 according to the process at Step S204 in FIG. 9, it is judged at Step S253 that the image data has been transferred to the first RAM 26, and then the process proceeds to Step S254.

At Step S254, the control subsection 55 controls the video-processing subsection 51, and makes the video-processing subsection convert image data, which has been held in the first RAM 26 as the result of the transfer according to the process at Step S204, into thumbnail image data.

At Step S255, the control subsection 55 copies the thumbnail image data subjected to the conversion according to the process at Step S254 to a given cache area preset in the first RAM 26.

Figure 8:
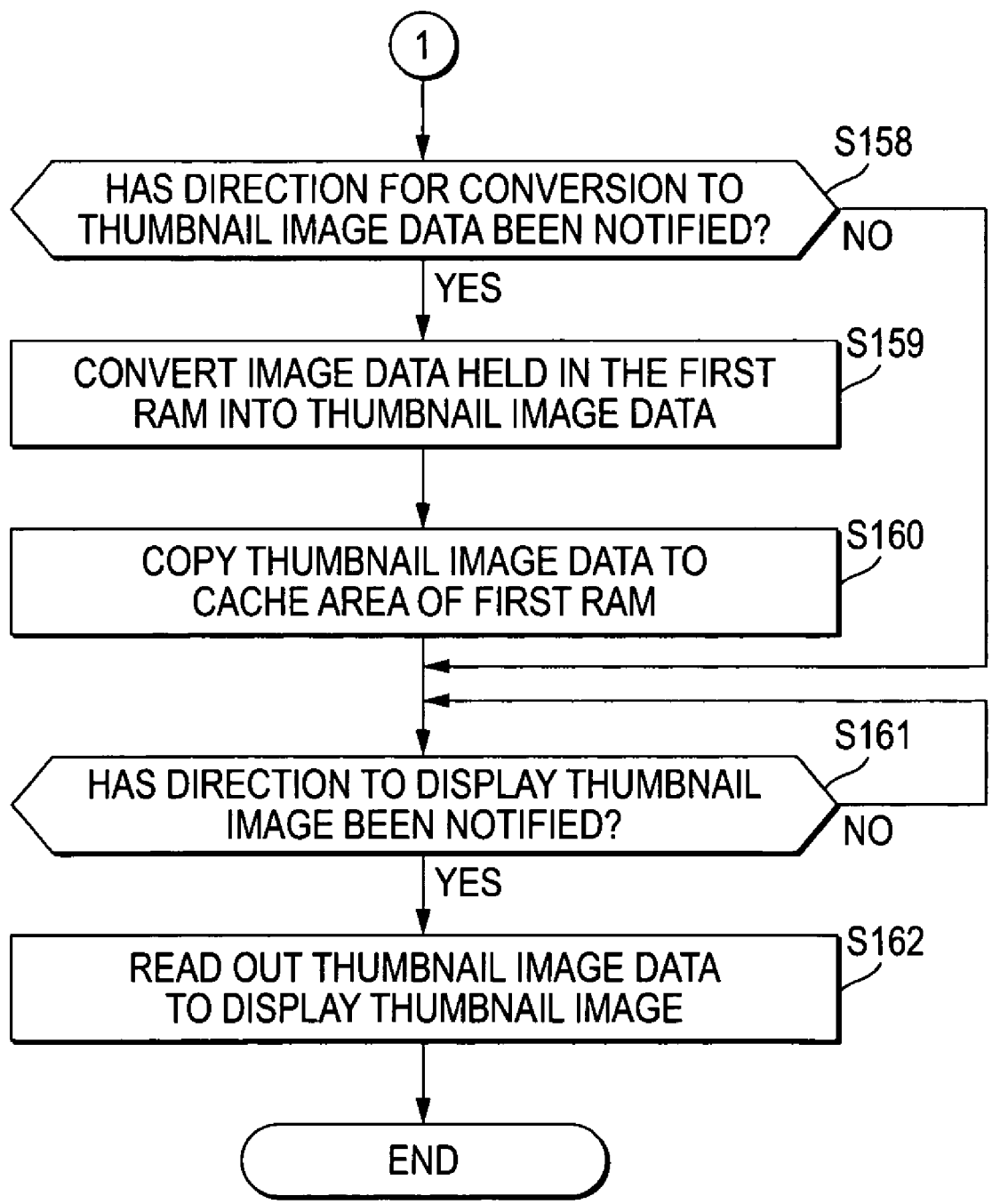
FIG. 8 is a flow chart of assistance in explaining the process A by the compressing/expanding section.

The processes at Steps S256 to S262 are the same as those at Steps S156 to S162 in FIGS. 7 and 8 and as such, their descriptions are omitted.

In this way, as in the case of the recording process (1), a thumbnail of data recorded on the optical disk 34 is displayed concurrently with terminating the recording process.

While with reference to FIGS. 5 to 11 has been described the process in which a thumbnail of data recorded on the optical disk 34 is displayed concurrently with terminating the recording process, the playback device 1 reproduces data recorded on the optical disk 34 as described above and then displays also the thumbnail of a reproduced recording unit (including e.g. a chapter).

Now, the reproduction process (1), an example of the data reproduction process by the playback device 1, will be described with reference to the flow chart of FIG. 12.

At Step S301, the system controller 30 judges based on a user operation (instruction) input through the input section 31 whether or not an instruction to start reproduction of image/sound data has been issued. The system controller waits until it is judged that an instruction to start the reproduction has been issued. When it is judged at Step S301 that an instruction to start the reproduction has been issued, the data is read out from the optical disk 34 through the drive controller 33, and then the process proceeds to Step S302.

At Step S302, the system controller 30 notifies the compressing/expanding section 25 of a direction to start decoding of the data read out from the optical disk 34. Thus, the video encoder/decoder 52 and the audio encoder/decoder 53 in the compressing/expanding section 25 use the first RAM 26 to start decoding of image data and sound data respectively. The workings of the compressing/expanding section 25 at this time will be described later in detail.

Figure 13:
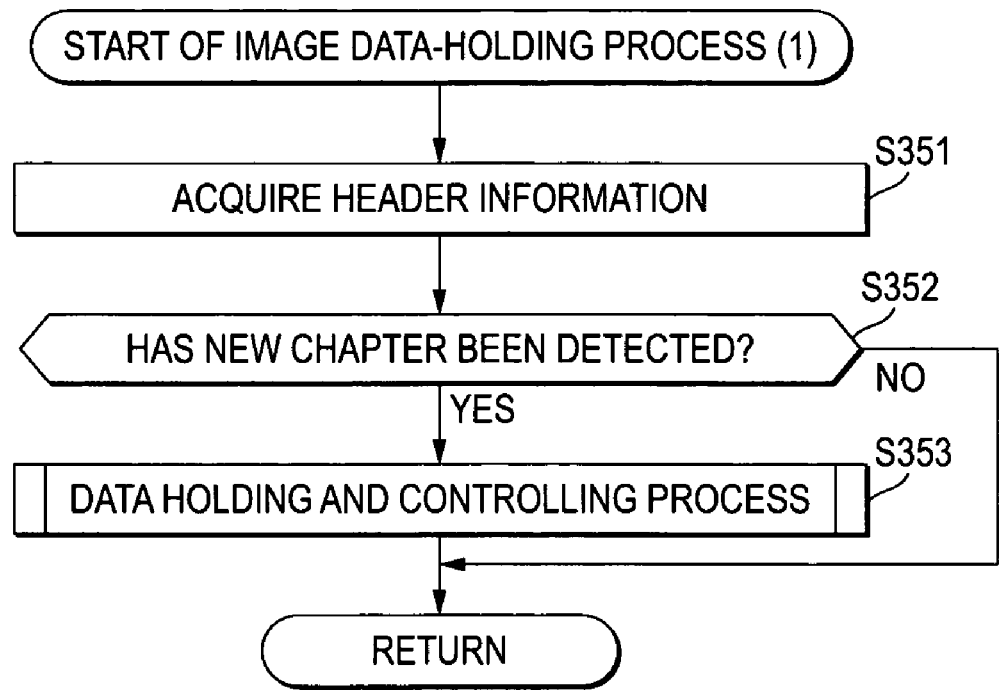
FIG. 13 is a flow chart of assistance in explaining an image data-holding process (1)

At Step S303, the system controller 30 executes an image data-holding process, which is to be described later with reference to FIG. 13. Thus, the compressing/expanding section 25 is directed to hold the image data required to create thumbnail image data.

At Step S304, the system controller 30 outputs the decoded image and sound data to the video output section 23 and the audio output section 24 thereby to output an image and sound. Thus, a user can watch and listen to reproduced image and sound.

At Step S305, the system controller 30 judges based on a user operation (instruction) input through the input section 31 whether or not an instruction to terminate reproduction of image/sound data has been issued. The processes at Steps S303 and S304 are executed repeatedly until it is judged that an instruction to terminate the reproduction has been issued. When it is judged at Step S305 that an instruction to terminate the reproduction has been issued, the process proceeds to Step S306.

At Step S306, the system controller 30 notifies the compressing/expanding section 25 of a direction to terminate encoding. Then, the video encoder/decoder 52 and the audio encoder/decoder 53 in the compressing/expanding section 25 terminate decoding of image data and sound data respectively.

At Step S307, the system controller 30 executes the process to display a thumbnail image. Then, the process is terminated. Thus, a representative image of image data read out from the optical disk 34 and reproduced is displayed as a thumbnail image.

The process to display a thumbnail image at Step S307 is the same as that described with reference to FIG. 6 and as such the detailed description thereof is omitted.

Now, the image data-holding process (1), an example of the image data-holding process at Step S303 of FIG. 12 will be described in detail with reference to the flow chart of FIG. 13.

At Step S351, the system controller 30 acquires separated header information from the header information processing section 29. The header information that the header information processing section 29 supplies to the system controller 30 is, for example, header information unique to a DVD, which shows the starting location (the frame number of a frame, time in a moving image or the like) of a chapter in image data.

At Step S352, the system controller 30 judges based on the header information whether or not a new chapter has been detected. When it is judged that a new chapter has been detected, the process proceeds to Step S353. When two or more new chapters are detected at Step S352, the process at Step S353 is executed each time a new chapter is detected.

At Step S353, the system controller 30 executes the data holding and controlling process, which is to be later described with reference to FIG. 14 or 15, and then the process is terminated. Thus, image data required to create thumbnail image data is held in the first RAM 26 or second RAM 28.

When it is judged at Step S352 that a new chapter has not been detected, the Step S353 is skipped and then the process is terminated.

Now, the data holding and controlling process (1), an example of the data holding and controlling process at Step S353 in FIG. 13, will be described with reference to the flow chart of FIG. 14.

At Step S371, the system controller 30 notifies the compressing/expanding section 25 of a direction to hold image data, and then the process is terminated. As a result, of image data decoded by the compressing/expanding section 25, the image data required to create thumbnail image data (e.g. image data that makes the first MPEG I picture detected after a direction to hold image data is given) is held (cached) by the first RAM 26.

Alternatively, the stream-managing section 27 may store the image data required to create a thumbnail image, of time division multiplexed data read-out from the optical disk 34, in the second RAM 28.

The data holding and controlling process (2), an example of the data holding and controlling process for the data in this case, will be described with reference to the flow chart of FIG. 15.

At Step S391, the system controller 30 controls the stream-managing section 27 and makes the stream-managing section 27 hold (store) the image data making the first MPEG I picture of a chapter in the second RAM 28.

Now, a series of the processes of extracting image data of a still image from image data of a moving image, creating thumbnail image data from the extracted image data, and caching the created thumbnail image data is carried out in parallel with the process of decoding the image data of the moving image. However, the processes may be executed according to the following procedure: extracting image data of a still image from image data of a moving image in parallel with decoding image data of the moving image; and after the process of reproducing image data of the moving image has been terminated, creating thumbnail image data and caching the created thumbnail image data.

For example, at Step S391 the system controller 30 may control the stream-managing section 27 and make the stream-managing section hold a program stream containing a MPEG I picture in the second RAM 28 in parallel with the process of decoding image data of the moving image. In this working, the system controller 30 acquires information on the location of a MPEG I picture in a program stream from the header information processing section 29 and as such, it becomes possible to hold the program stream containing the MPEG I picture in the second RAM 28.

After that, the system controller 30 makes the stream-managing section 27 transmit the program stream, which is time division multiplexed data held by the second RAM 28, to the multiplexing subsection 54, in which the program stream is separated into elementary streams. Incidentally, the elementary streams are image data. In addition, the system controller 30 exercises control so as to make the first RAM 26 hold the elementary streams, i.e. separated image data. Thereafter, the system controller 30 exercises control so that image data making a MPEG I picture is extracted from image data stored in the first RAM 26.

At Step S391, the system controller 30 may control the playback device so that image data making a MPEG I picture is extracted directly from a program stream that is time division multiplexed data stored in the second RAM 28.

At Step S392, the system controller 30 uses the stream-managing section 27 and the compressing/expanding section 25 to transfer the image data held in the second RAM 28 according to the process at Step S391 to the first RAM 26. Then, the process is terminated. Specifically, at Step S392 the stream-managing section 27 reads out image data to create thumbnail image data from the second RAM 28, and supplies the read image data to the compressing/expanding section 25. The compressing/expanding section 25 stores the image data supplied from the stream-managing section 27 in the first RAM 26.

As the result of the processes at Steps S391 and S392, the image data required to create a thumbnail image (i.e. image data making the first MPEG I picture of a chapter in this case) is stored (held) by the first RAM 26 as in the case of the data holding and controlling process (1).

Figure 17:
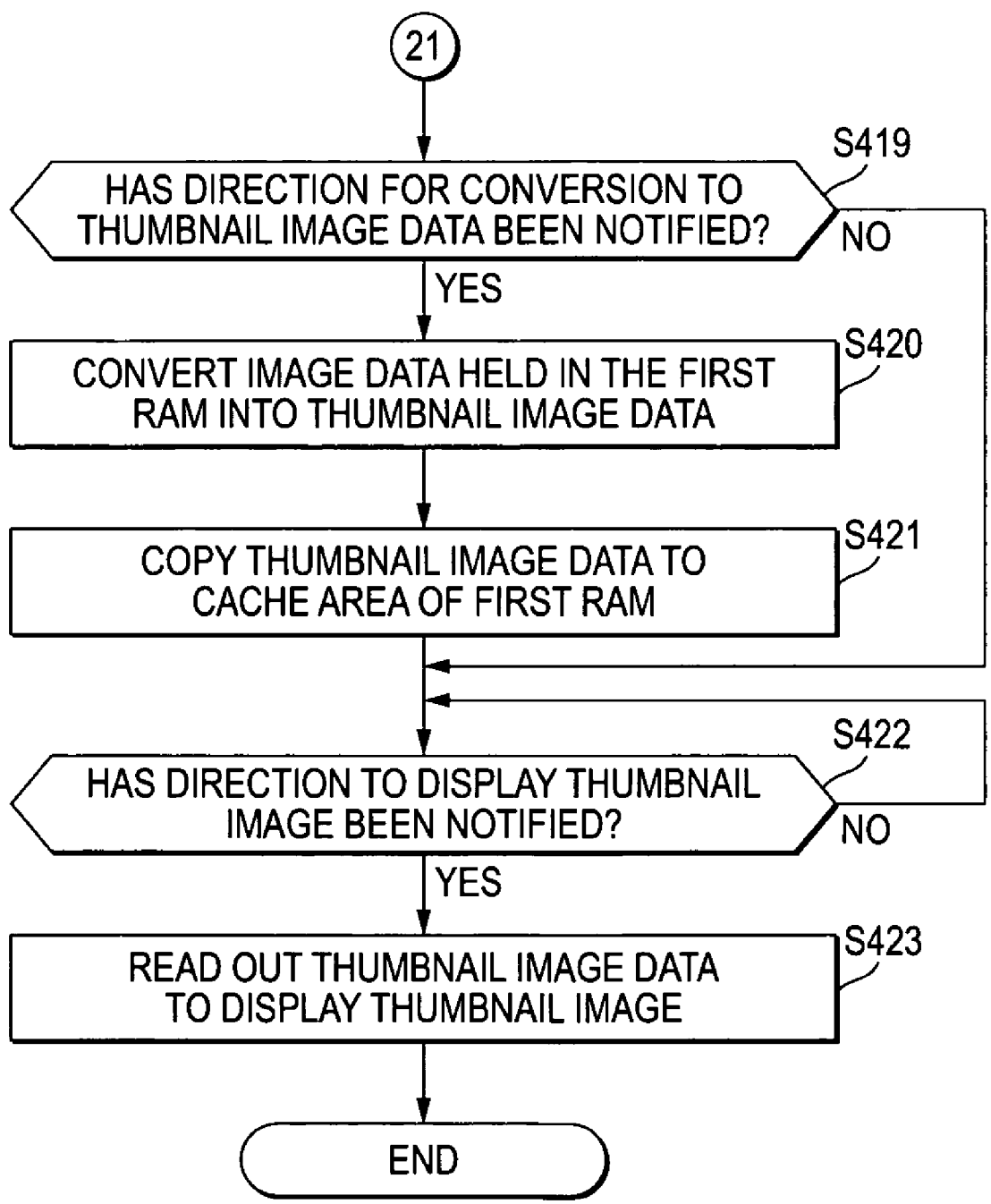
FIG. 17 is a flow chart of assistance in explaining the process C by the compressing/expanding section.

Now, the process C by the compressing/expanding section, a process that the compressing/expanding section 25 executes according to the reproduction process described with reference to FIGS. 12 to 14 (the data holding and controlling process (1)), will be described with reference to flow charts of FIGS. 16 and 17.

At Step S411, the control subsection 55 in the compressing/expanding section 25 judges whether or not a direction to start decoding has been notified from the system controller 30. The control subsection 55 waits until it is judged that a direction to start decoding has been notified.

Figure 12:
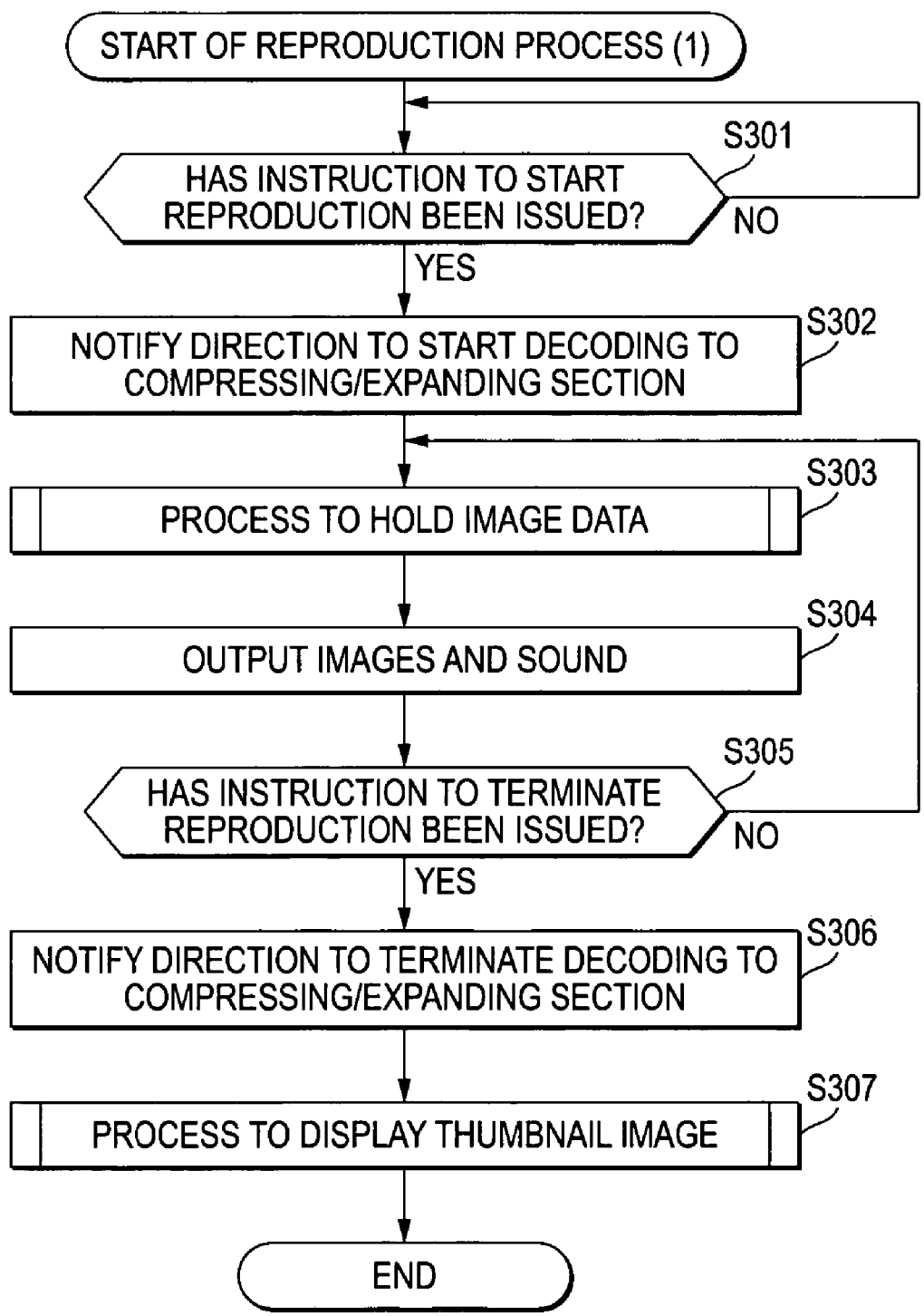
FIG. 12 is a flow chart of assistance in explaining a reproduction process.

When the system controller 30 has notified a direction to start decoding to the compressing/expanding section 25 according to the process at Step S302 in FIG. 12, it is judged at Step S411 that a direction to start decoding has been notified. Then, the process proceeds to Step S412.

At Step S412, the control subsection 55 controls the video encoder/decoder 52 and the audio encoder/decoder 53 and makes them start decoding of image data and sound data read out from the optical disk 34.

At Step S413, the control subsection 55 judges whether or not a direction to hold image data has been notified from the system controller 30. When it is judged that a direction to hold image data has not been notified yet, the process is returned to Step S413, and then the judging process is executed again.

Figure 14:
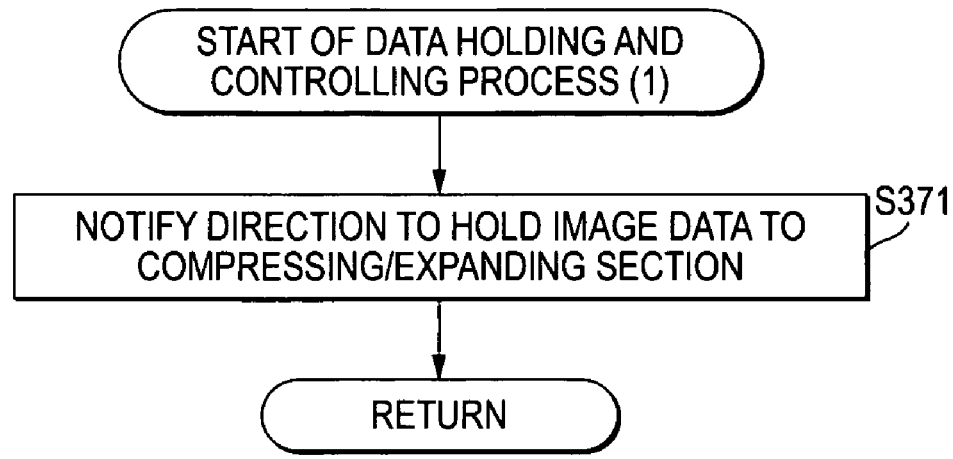
FIG. 14 is a flow chart of assistance in explaining a data holding and controlling process (1)

When the system controller 30 has notified the compressing/expanding section 25 of a direction to hold image data according to the process at Step S371 in FIG. 14, it is judged at Step S413 that a direction to hold image data has been notified. Then, the process proceeds to Step S414.

At Step S414, the control subsection 55 makes the first RAM 26 hold (store) the image data making the first MPEG I picture of a chapter, in which the image data making the first MPEG I picture of the chapter is kept for the purpose of creating thumbnail image data. The image data used to create thumbnail image data is not limited to the image data that will make the first MPEG I picture of a chapter, and it may be appropriately set to a piece of image data at the time when the input section 31 was operated.

The video encoder/decoder 52 extracts the image data of one frame from the image data of a reproduced moving image. In other words, the video encoder/decoder 52 extracts image data to display a still image from the image data of a moving image read out from the optical disk 34. The video encoder/decoder 52 stores the extracted image data in the first RAM 26.

In more detail, the video encoder/decoder 52 may extract image data to display a still image from the image data of a moving image that has been read out from the optical disk 34 and has not been decoded (decrypted) yet. Also, the video encoder/decoder 52 may extract image data to display a still image from the image data of a moving image that has been read out from the optical disk 34 and has been decoded (decrypted).

Extraction of image data to display a still image from decoded image data can eliminate the needs for the process such as decrypting the image data again in a later process, and therefore the process can be made simpler. Further, in the case of extracting image data to display a still image from image data that has not been decoded yet, i.e. encoded image data, the data amount of the extracted image data is made smaller and as such, the image data can be stored in a smaller storage region of the first RAM 26.

At Step S415, the control subsection 55 controls the video-processing subsection 51 and makes it convert image data held according to the process at Step S414 into thumbnail image data.

At S416, the control subsection 55 copies (stores) the thumbnail image data resulting from the conversion according to the process at Step S415 to a given preset cache area in the first RAM 26. The processes at Steps S414 to S416 are executed in parallel with the process of decoding of image data.

At Step S417, the control subsection 55 judges whether or not a direction to terminate decoding has been notified from the system controller 30. When it is judged that a direction to terminate decoding has not been notified, the video encoder/decoder 52 and the audio encoder/decoder 53 perform the decoding of image data and sound data without interruption. Then the process is returned to Step S417, and the judging process is repeated until it is judged that a direction to terminate decoding has been notified.

When the system controller 30 has notified the compressing/expanding section 25 of a direction to terminate decoding according to the process at Step S306 in FIG. 12, it is judged at Step S417 that a direction to terminate decoding has been notified. Then, the process proceeds to Step S418.

At Step S418, the control subsection 55 forces the video encoder/decoder 52 and the audio encoder/decoder 53 to terminate decoding.

At Step S419, the control subsection 55 judges whether or not a direction for conversion to thumbnail image data has been notified from the system controller 30. When it is judged that a direction for conversion to thumbnail image data has been notified, the process proceeds to Step S420. When it is judged that a direction for conversion to thumbnail data has not been notified, the process proceeds to Step S422 (Steps S420 and S421 are skipped).

When the system controller 30 has notified the compressing/expanding section 25 of a direction for conversion to thumbnail image data according to the process at Step S124 in FIG. 6, it is judged at Step S419 that a direction for conversion to thumbnail image data has been notified. Then, the process proceeds to Step S420.

At Step S420, the control subsection 55 controls the video-processing subsection 51 and makes it convert image data, which has been read out from the optical disk 34 and held in the first RAM 26 according to the process at Step S123, into thumbnail image data. At Step S421, the control subsection 55 copies (stores) thumbnail image data resulting from (created by) the conversion according to the process at Step S420 to (in) a cache area of the first RAM 26.

When thumbnail image data has been cached according to the processes at Steps S415 and S416, it is not necessary to newly create thumbnail image data and as such, the Steps S420 and S421 are skipped. Thus, the time required to display a thumbnail image can be shortened.

When it is required to display a thumbnail image that has not been cached yet for some reason, the processes at Steps S420 and S421 are carried out to newly create thumbnail image data involved in execution of the processes at Steps S123 and S124 in FIG. 6.

At Step S422, the control subsection 55 judges whether or not a direction to display a thumbnail image has been notified from the system controller 30. The control subsection 55 waits until it is judged that a direction to display a thumbnail image has been notified.

When the system controller 30 has notified the compressing/expanding section 25 of a direction to display a thumbnail image according to the process at Step S125 in FIG. 6, it is judged at Step S422 that a direction to display a thumbnail image has been notified. Then, the process proceeds to Step S423.

At Step S423, the control subsection 55 reads out thumbnail image data from a cache area of the first RAM 26 and outputs the readout to the video output section 23. Then, the process is terminated. Thus, for example, the video output section 23 may display an image by itself, or a thumbnail image may be displayed on a display device or the like connected with the video output section 23.

Thus, a thumbnail image of data (chapter) read out from the optical disk 34 and reproduced can be displayed immediately after the termination of the reproduction process.

Figure 18:
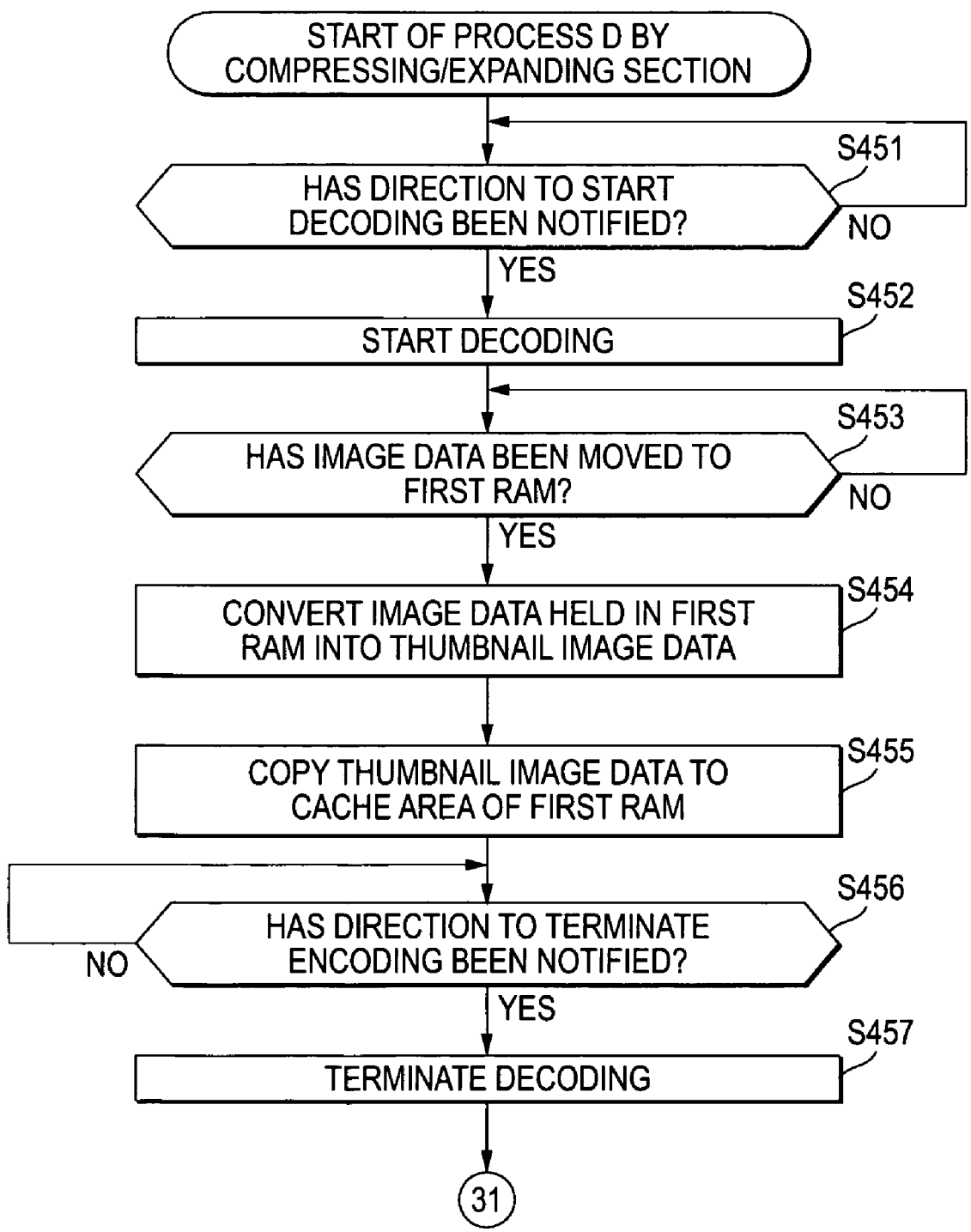
FIG. 18 is a flow chart of assistance in explaining a process D by the compressing/expanding section.
Figure 19:
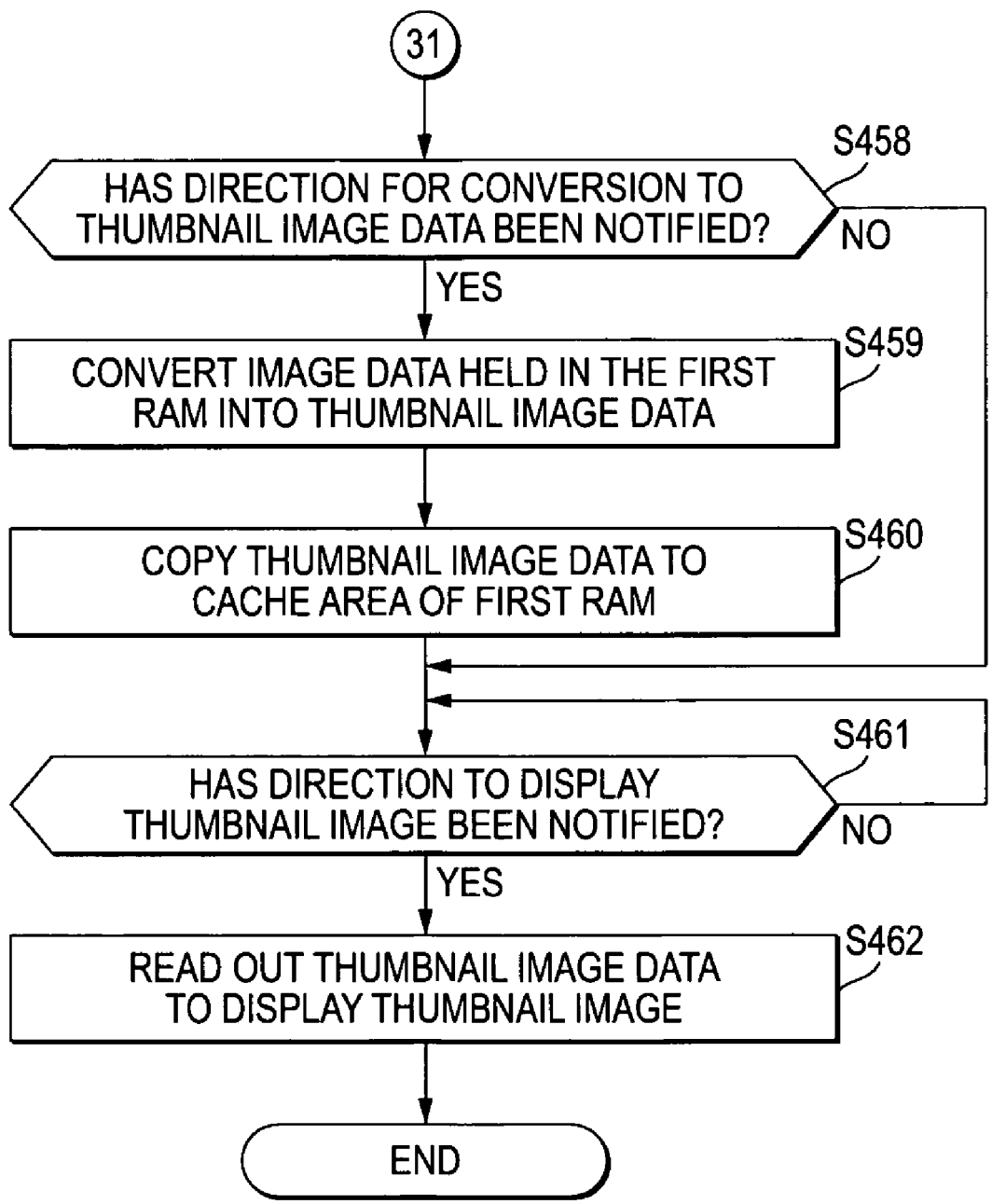
FIG. 19 is a flow chart of assistance in explaining the process D by the compressing/expanding section.

Now, the process D by the compressing/expanding section, a process that the compressing/expanding section 25 executes according to the reproduction process described with reference to FIGS. 12, 13 and 15 (for the data holding and controlling process (2)), will be described with reference to the flow charts of FIGS. 18 and 19.

At Step S451, the control subsection 55 in the compressing/expanding section 25 judges whether or not a direction to start decoding has been notified from the system controller 30. The control subsection 55 waits until it is judged that a direction to start decoding has been notified.

When the system controller 30 has notified the compressing/expanding section 25 of a direction to start decoding according to the process at Step S302 in FIG. 12, it is judged at Step S451 that a direction to start decoding has been notified. Then the process proceeds to Step S452.

At Step S452, the control subsection 55 controls the video encoder/decoder 52 and the audio encoder/decoder 53 and makes them start decoding of image and sound data read out from the optical disk 34.

At Step S453, the control subsection 55 judges whether or not image data has been transferred from the second RAM 28 to the first RAM 26. When it is judged that no image data has been transferred to the first RAM 26, the process at Step S453 is executed repeatedly until image data is transferred to the first RAM 26.

Figure 15:
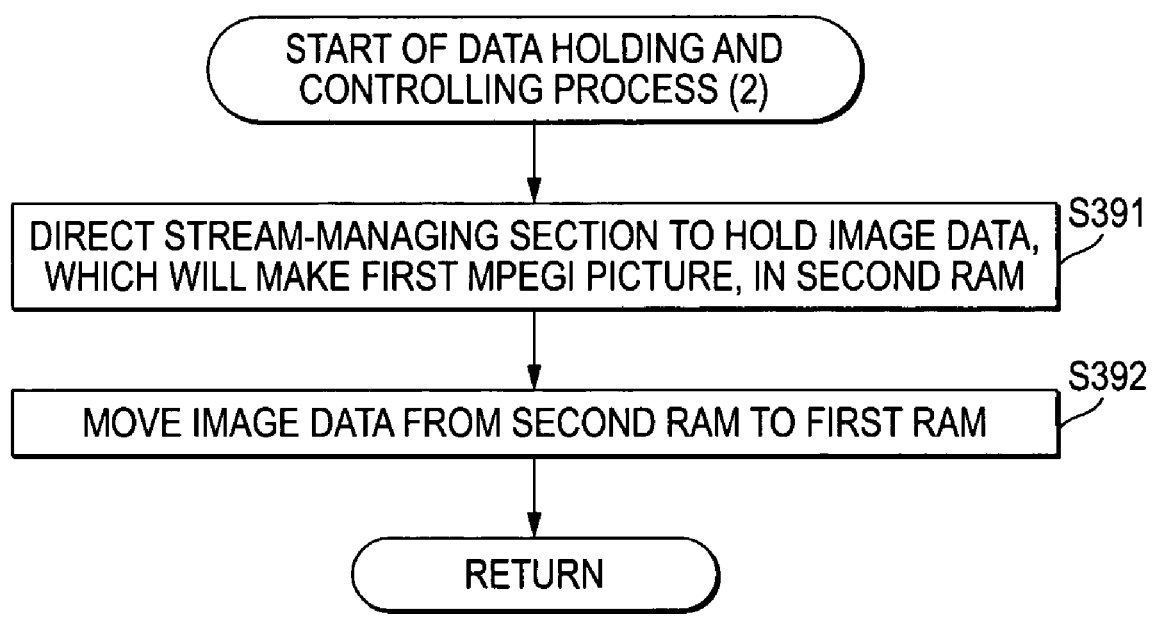
FIG. 15 is a flow chart of assistance in explaining a data holding and controlling process (2)

When image data has been transferred from the second RAM 28 to the first RAM 26 according to the process at Step S392 in FIG. 15, it is judged at Step S453 that image data has been transferred to the first RAM 26. Then, the process proceeds to Step S454.

At Step S454, the control subsection 55 controls the video-processing subsection 51 and makes it convert the image data, which has been transferred to the first RAM 26 according to the process at Step S392 and held by the first RAM 26, into thumbnail image data.

At Step S455, the control subsection 55 copies thumbnail image data subjected to the conversion according to the process at Step S454 to a given preset cache area of the first RAM 26.

At Step S456, the control subsection 55 judges whether or not a direction to terminate decoding has been notified from the system controller 30. When it is judged that a direction to terminate decoding has not been notified yet, the video encoder/decoder 52 and the audio encoder/decoder 53 continue decoding image data and sound data without interruption. The process is returned to Step S456, and the judging process is repeatedly executed as described above until it is judged that a direction to terminate decoding has been notified.

When the system controller 30 has notified the compressing/expanding section 25 of a direction to terminate decoding according to the process at Step S306 in FIG. 12, it is judged at Step S456 that a direction to terminate decoding has been notified. Then, the process proceeds to Step S457.

At Step S457, the control subsection 55 forces the video encoder/decoder 52 and the audio encoder/decoder 53 to terminate decoding.

The processes at Steps S458 to S462 are the same as those at Steps S158 to S162 in FIG. 8 and as such, their descriptions are omitted.

Thus, a thumbnail image of data read out from the optical disk 34 and reproduced is still displayed concurrently with terminating the reproduction process.

On another note, the first RAM 26 that holds (stores) thumbnail image data is limited in capacity and as such, it can not hold thumbnail image data infinitely. In the foregoing example, the first RAM 26 is configured in e.g. a ring buffer. Therefore in the case where its capacity reaches the limit thereof, if a new piece of thumbnail image data is stored, old thumbnail image data whose capacity contains that the new data occupies is deleted. The first RAM 26 utilized in a ring buffer is suitable for the case where the thumbnail of the newest (last reproduced) chapter is assigned a higher priority and displayed. However, with such first RAM, e.g. in the case where it is desired to selectively display a thumbnail of an important chapter, a thumbnail of a desired chapter can be deleted. Therefore, a measure to selectively cache the video data required to create thumbnail image data may be taken.

Figure 20:
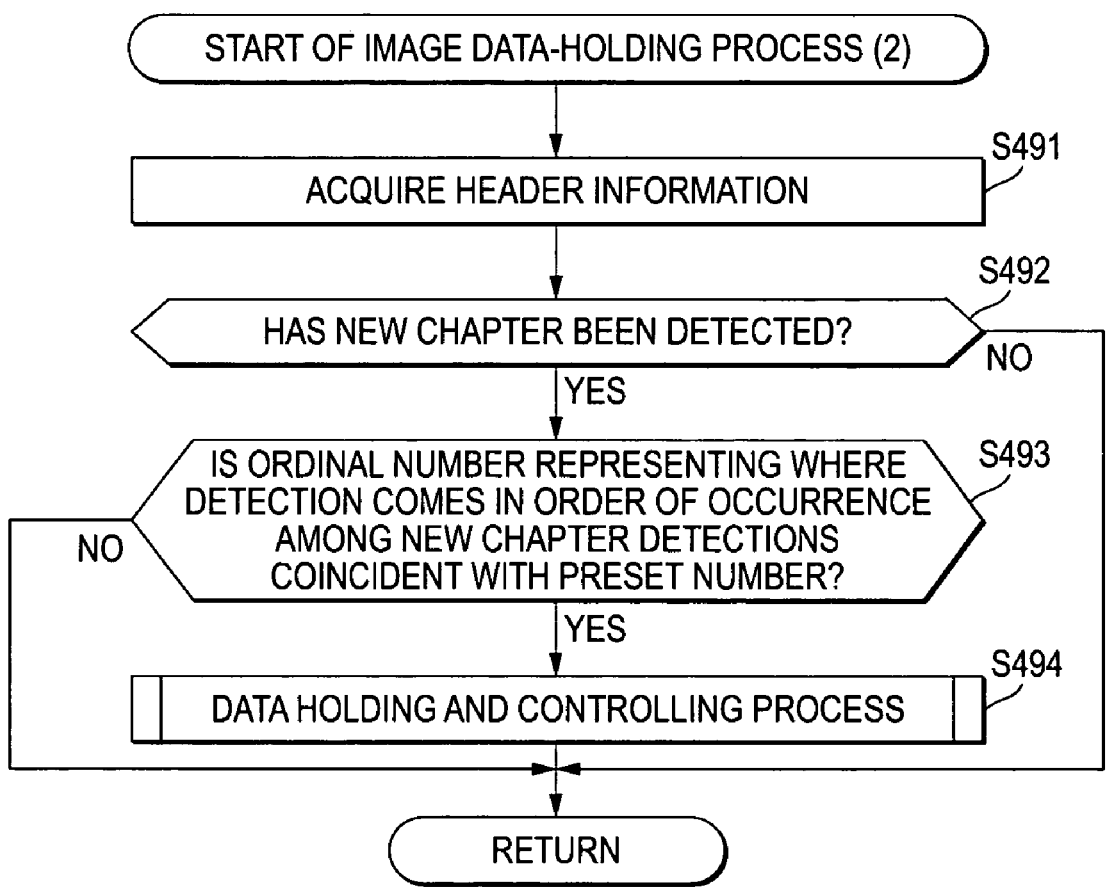
FIG. 20 is a flow chart of assistance in explaining an image data-holding process (2)

Now, the image data-holding process (2) in the case of selectively caching image data (video data) required to create thumbnail image data will be described with reference to the flow chart of FIG. 20. As in the case of the process described above with reference to FIG. 13, the process is an example of the image data-holding process (at Step S303) that has been described above with reference to FIG. 12.

At Step S491, separated header information is acquired from the header information processing section 29 by the same process as that at Step S351.

At Step S492, the system controller 30 judges based on the header information whether or not a new chapter has been detected. When it is judged that a new chapter has been detected, the process proceeds to Step S493. However, in the case where two or more new chapters have been detected at Step S492, the process at Step S493 is executed each time a new chapter is detected.

At Step S493, the system controller 30 judges whether or not the ordinal number representing where a last detected chapter ranks in order of occurrence among all the detected chapters is coincident with any of preset numbers of times. When it is judged that the ordinal number of a new chapter detection is coincident with one of the preset numbers of times, the process proceeds to Step S494. In contrast, when it is judged that the ordinal number of a new chapter detection is not coincident with any of the preset numbers of times, Step S494 is skipped, and then the process is terminated.

Figure 21:
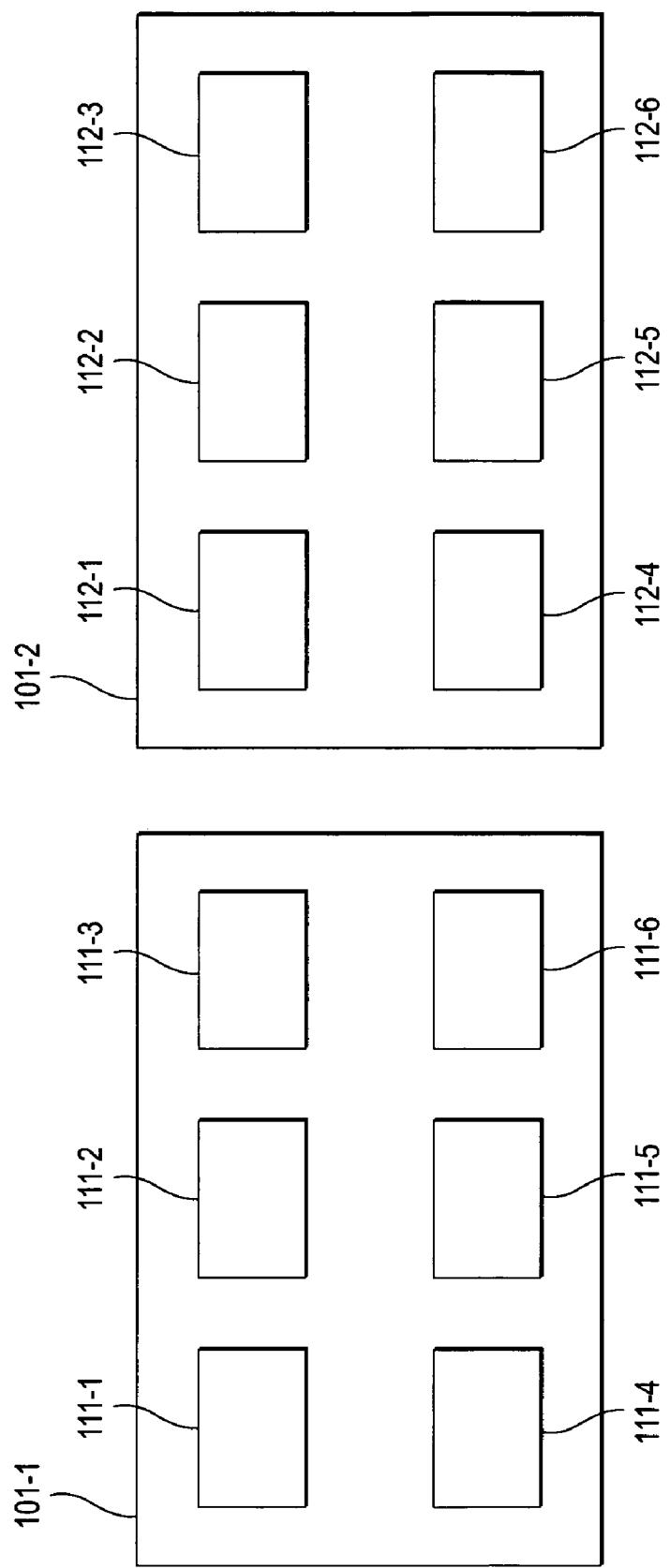
FIG. 21 is a view showing an example for display of thumbnails.
Figure 22:
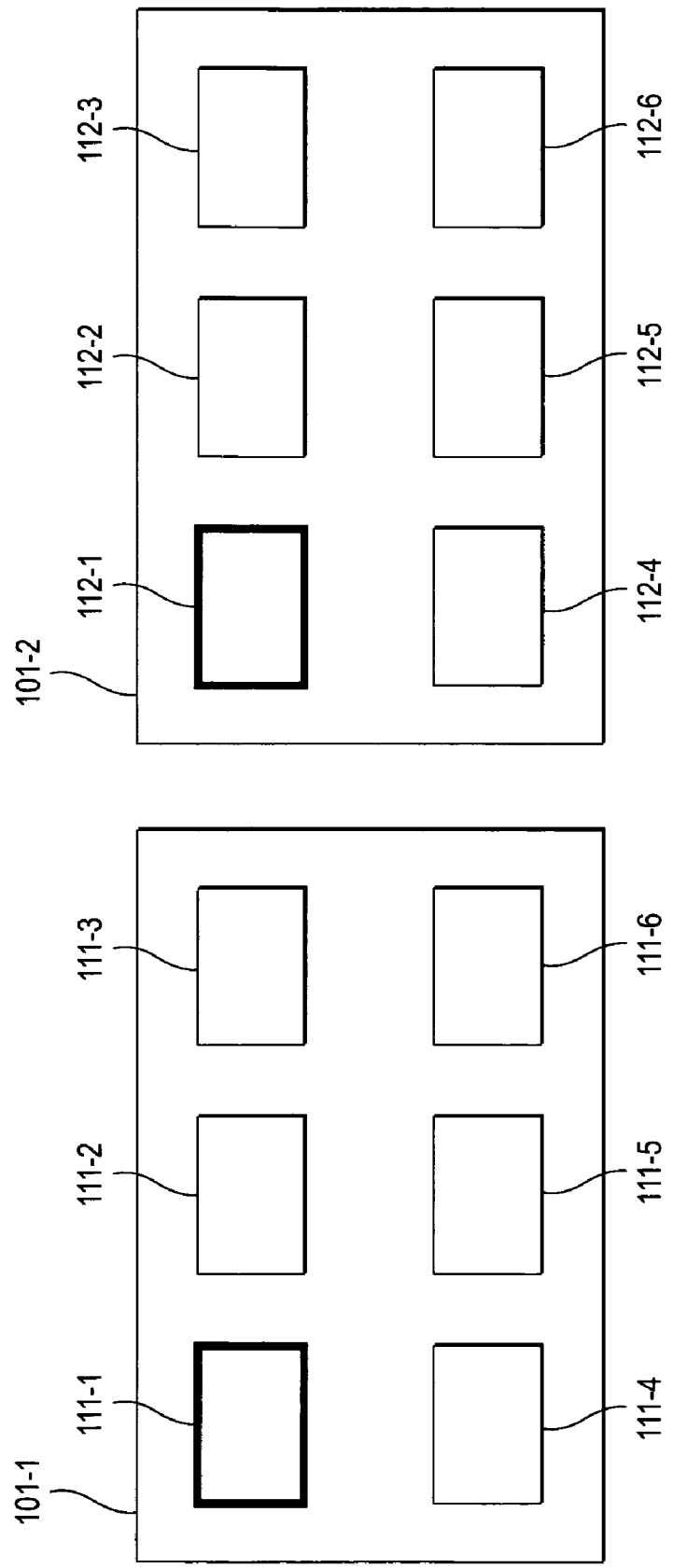
FIG. 22 is a view showing an example of the way a thumbnail to be cached is selected.
Figure 23:
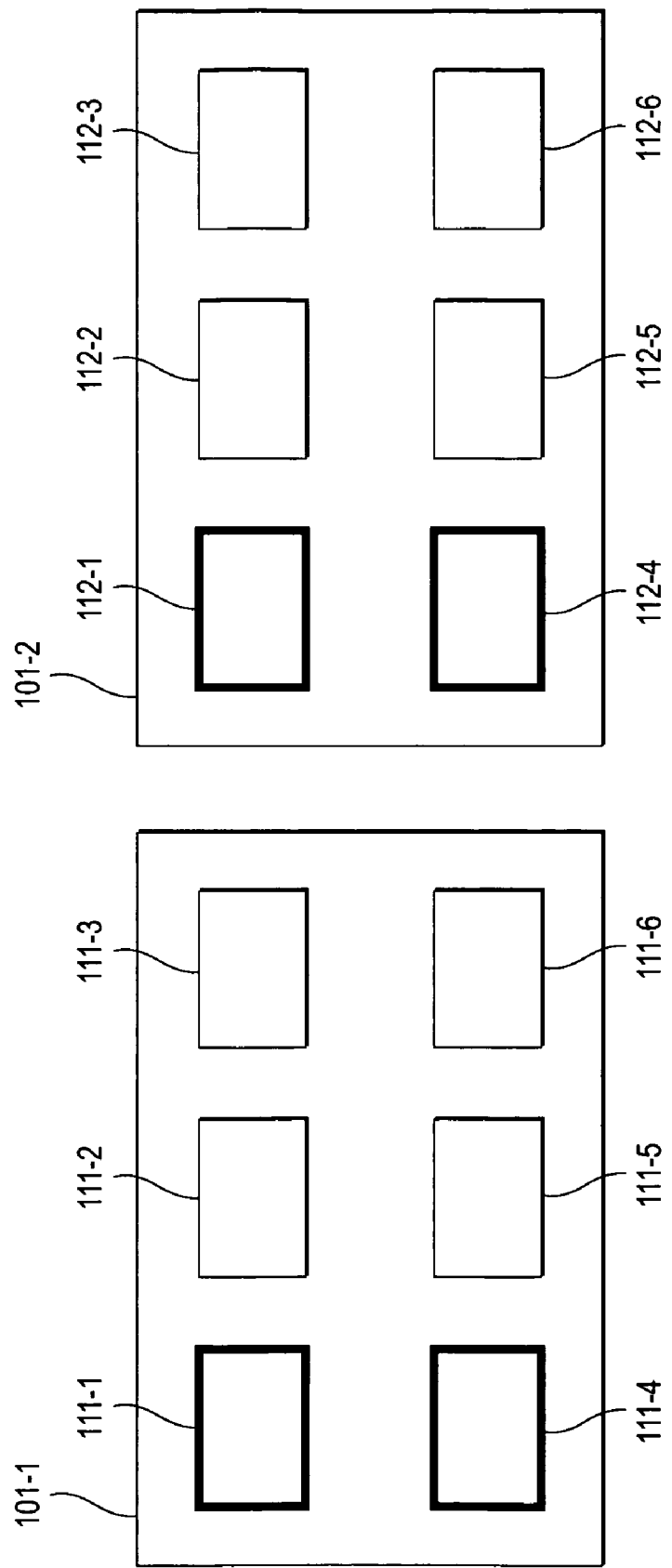
FIG. 23 is a view showing another example of the way a thumbnail to be cached is selected.

The processes at Step S493 and S494 will be described with reference to FIGS. 21 to 23 more specifically. For example, considered is the case where a thumbnail image displayed on a display screen is as shown by FIG. 21. In FIG. 21, two or more thumbnail images (six thumbnail images in this case) are displayed in a lot as Index 101-1 or 101-2. For Index 101-1, six thumbnail images 111-1 to 111-6 are displayed. Likewise, for Index 101-2, six thumbnail images 112-1 to 112-6 are displayed. Here, the thumbnail images 111-1 to 111-6 are thumbnail images of the first to sixth chapters; the thumbnail images 112-1 to 112-6 are thumbnail images of the seventh to twelfth chapters.

Now, considered is, for example, the case where twelve chapters (twelve pieces of image data) are recorded on the optical disk 34 and all the chapters are reproduced in order from the first chapter. In the case where only up to two thumbnail images can be cached in the first RAM 26, if the preset numbers of times in Step S493 are one and seven, only the top (first) thumbnails of Indexes (the thumbnail images 111-1 and 112-1 in this case) are cached as shown by frames drawn with a heavy solid line in FIG. 22.

By taking a measure like this, when Indexes 101-1 and 101-2 are displayed concurrently with terminating the reproduction process, the thumbnail images 111-1 and 112-1 can be displayed immediately after the termination of the reproduction process.

In contrast, it takes a lot of time to display the thumbnail images 111-2 to 111-6 and 112-2 to 112-6 because their data have to be read out from the optical disk 34 to newly create thumbnail image data. However, it can be considered that when the top thumbnail of each Index is displayed, a user can imagine the contents of image/sound data contained in Index overall. Therefore, when the reproduction process is terminated, a user can perform a next operation immediately without waiting for display of Index.

Thus, the following advantages are brought about at a time: user's operationality is improved; the storage capacity of the first RAM 26 is not occupied needlessly; and a resource (RAM memory) of the playback device 1 can be put to practical use effectively.

Of course, the playback device may be arranged so that only the last thumbnail of each Index (thumbnail image 111-6 and 112-6 in this case) is cached instead of the top thereof.

Alternatively, only a given number of thumbnails may be cached by thinning out the thumbnails to be cached depending on the capacity of the memory (first RAM 26). For example, as shown by frames drawn with a heavy solid line in FIG. 23, the thumbnail images may be thinned out, thereby caching only the thumbnail images 111-1, 111-4, 112-1 and 112-4. In other words, every three thumbnail images may be cached. By taking such measure, user's operationality can be further improved in comparison to the case shown by FIG. 22.

At Step S493, it is judged whether or not the ordinal number representing where the detection ranks among new chapter detections is coincident with any of the present numbers of times for the purpose of selectively caching thumbnail images as described with reference to FIG. 22 or 23 according to the process at Step S494.

Referring to FIG. 20 again, as in the drawing the system controller 30 executes the data holding and controlling process at Step S494. Then, the process is terminated. Thus, the compressing/expanding section 25 is directed to hold the video data required to create thumbnail image data. The data holding and controlling process at Step S494 is the same as the process described with reference to FIG. 14 or 15 and as such, the detailed description thereof is omitted.

Thus, a resource of the playback device 1 can be put to practical use effectively, and a thumbnail can be displayed in a shorter period of time.

Further, thumbnail image data that has been temporarily stored (cached) in the first RAM 26 in the recording process may be recorded on the optical disk 34.

Figure 24:
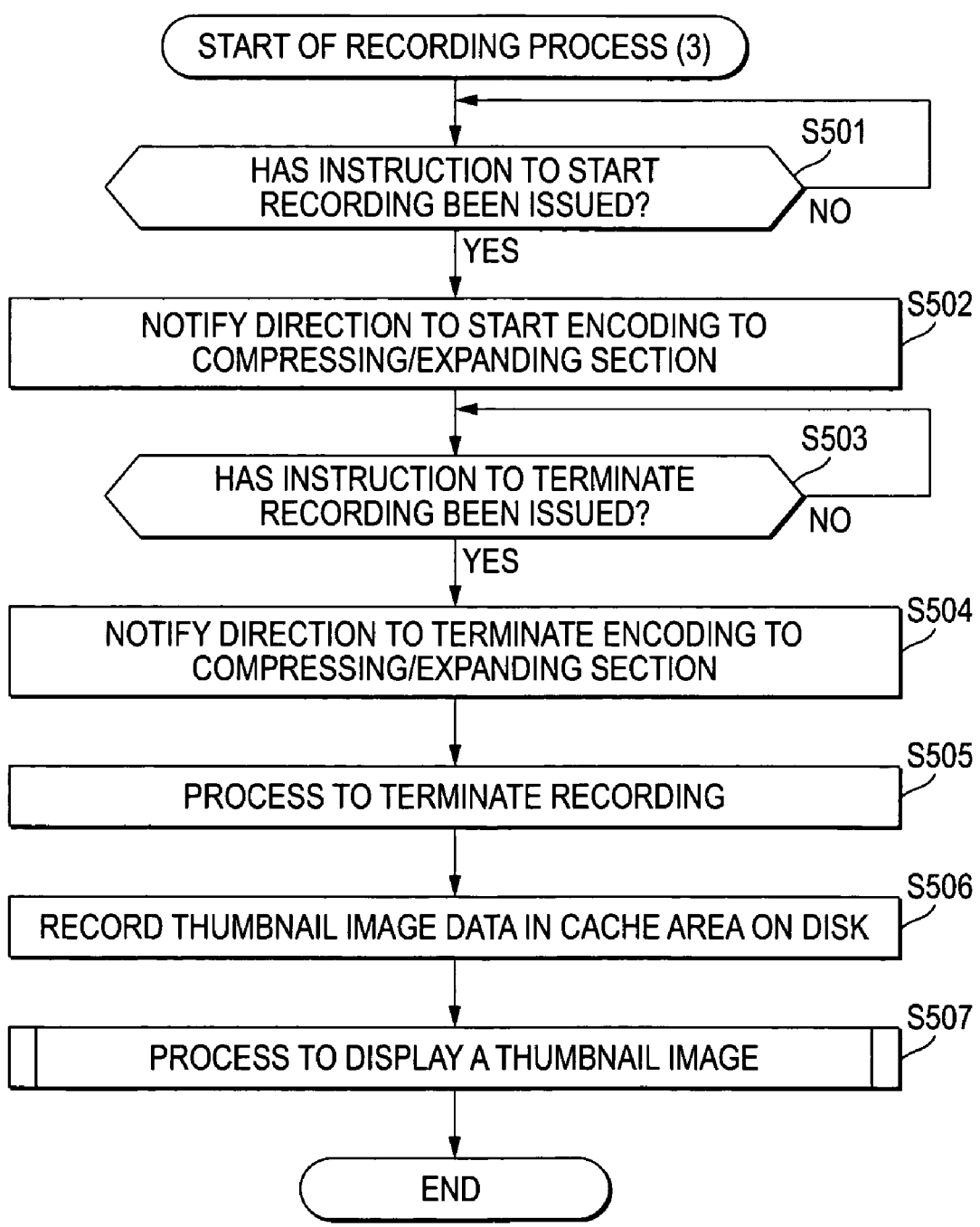
FIG. 24 is a flow chart of assistance in explaining a recording process (3)

FIG. 24 is a flow chart of assistance in explaining the recording process (3), an example of the recording process by the playback device 1 in the case of recording thumbnail image data temporarily stored in the first RAM 26 on the optical disk 34.

The processes at Steps S501 to S505 are the same as those at Steps 101 to S105 in FIG. 5 and as such, their descriptions are omitted.

At Step S506, the system controller 30 uses the compressing/expanding section 25, stream-managing section 27, header information processing section 29 and drive controller 33 to record thumbnail image data stored in a cache area of the first RAM 26 on the optical disk 34.

Specifically, the compressing/expanding section 25 reads out the thumbnail image data from the cache area of the first RAM 26 and supplies the read thumbnail image data to the stream-managing section 27 under the control of the system controller 30. The stream-managing section 27 makes the header information processing section 29 fix the format of the thumbnail image data by e.g. adding a given header, and supplies the thumbnail image data fixed in its format to the drive controller 33 under the control of the system controller 30. The drive controller 33 makes a drive (not shown) record the thumbnail image data supplied from the stream-managing section 27 on the optical disk 34 under the control of the system controller 30.

The process at Step S507 is the same as that at Step S206 in FIG. 5 and as such, the description thereof is omitted.

Also, the thumbnail image data temporarily stored (cached) in the first RAM 26 in the reproduction process may be recorded on the optical disk 34.

Figure 25:
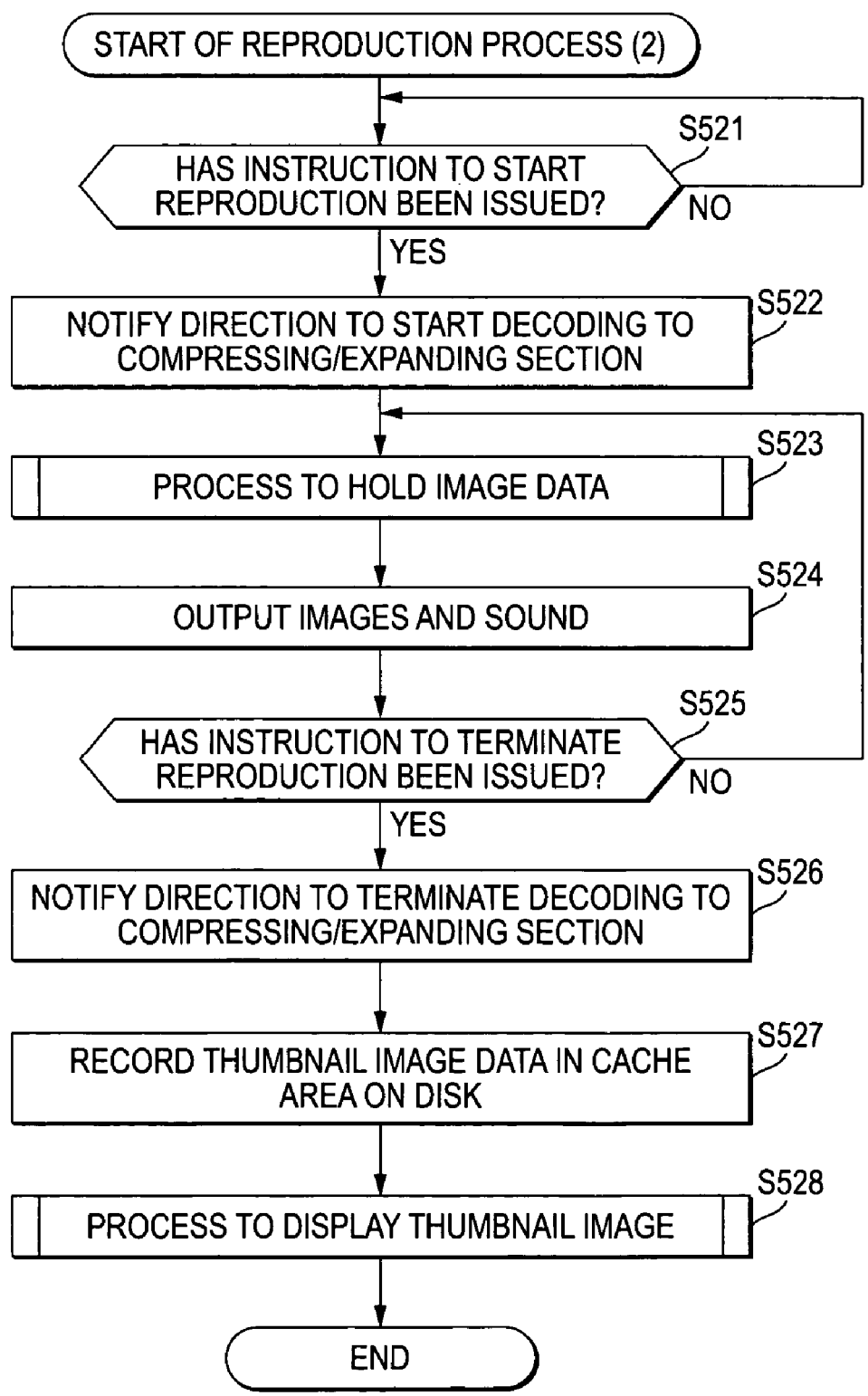
FIG. 25 is a flow chart of assistance in explaining a reproduction process (2)

FIG. 25 is a flow chart of assistance in explaining the reproduction process (2), an example of the reproduction process by the playback device 1 in the case of recording the thumbnail image data temporarily stored in the first RAM 26 on the optical disk 34.

The processes at Steps S521 to S526 are the same as those at Steps S301 to S306 in FIG. 12 and as such, their descriptions are omitted.

At Step S527, the system controller 30 uses the compressing/expanding section 25, stream-managing section 27, header information processing section 29 and drive controller 33 to record the thumbnail image data stored in a cache area of the first RAM 26 on the optical disk 34.

Specifically, the compressing/expanding section 25 reads out the thumbnail image data from the cache area of the first RAM 26 and supplies the read thumbnail image data to the stream-managing section 27 under the control of the system controller 30. The stream-managing section 27 makes the header information processing section 29 fix the format of the thumbnail image data by e.g. adding a given header, and supplies the thumbnail image data fixed in its format to the drive controller 33 under the control of the system controller 30. The drive controller 33 makes the drive (not shown) record the thumbnail image data supplied from the stream-managing section 27 on the optical disk 34 under the control of the system controller 30.

The process at Step S528 is the same as that at Step S307 in FIG. 12 and as such, the description thereof is omitted.

As described above, it is possible to record the thumbnail image data temporarily stored (cached) in the first RAM 26 in the recording process or reproduction process on the optical disk 34. In this way, when a thumbnail that has not been stored in a given preset cache area of the first RAM 26 is displayed, the thumbnail image can be displayed readily by reading out the thumbnail image data instead of reading out the time division multiplexed data from the optical disk 34 to create the thumbnail image data. In addition, thumbnail image data is recorded on the optical disk 34 when the recording process or reproduction process is executed, which means the optical disk 34 has necessary thumbnail image data.

Incidentally, in the case where thumbnail image data has been already recorded on the optical disk 34 at Step S506 or S527, additional thumbnail image data may be recorded on the optical disk 34 by overwriting the existing thumbnail image data.

While an example that the playback device 1 shown by FIG. 4 performs the recording or reproduction process has been described above, the playback device 1 may be arranged so that it includes, for example, a recorder-customized for a recording function and a player customized for a reproducing function, in which the recorder performs the recording process and the player carries out the reproduction process.

In addition, the compressing/expanding section 25 may be arranged so that two or more thumbnail images (e.g. a thumbnail, image for an image at the top of the chapter and a thumbnail image for an image selected by a user) are displayed on one screen at a time, or the thumbnail images are displayed while being switched every elapsed times when the two or more thumbnail images are cached for one chapter. For example, the thumbnail images may be displayed so that a thumbnail image for an image at the top of the chapter and a thumbnail image for a user-selected image are switched every three seconds.

A series of the processes described above may be executed by hardware or software. In the case where the series of the processes are executed by software, programs constituting the software may be installed through a network or from a recording medium onto a computer incorporated in a dedicated piece of hardware, or e.g. a multipurpose personal computer 300 as shown in FIG. 26 that can execute various kinds of functions in the condition where various kinds of programs are installed thereon.

Figure 26:
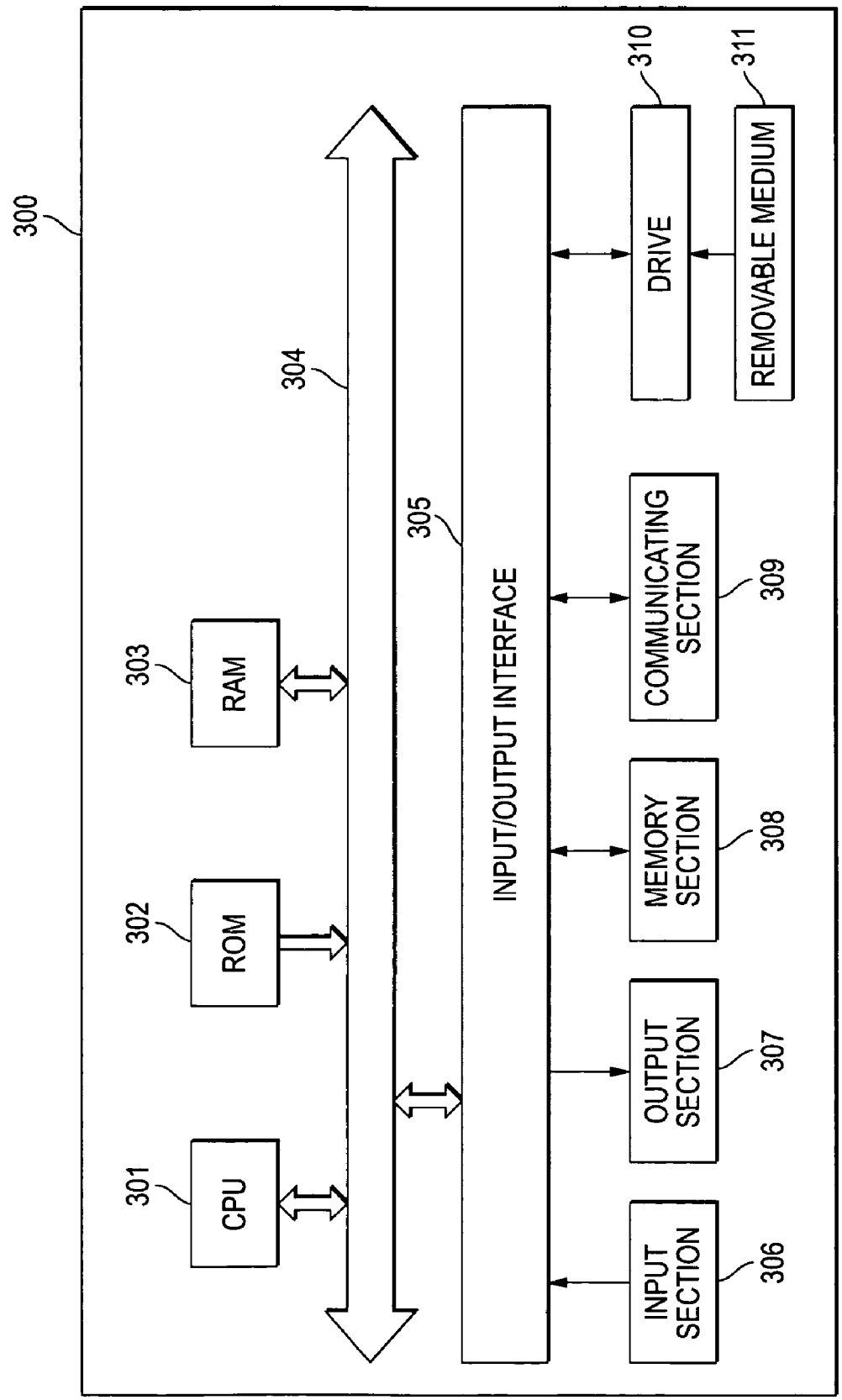
FIG. 26 is a block diagram showing an example of the configuration of a personal computer.

In the case shown by FIG. 26, the CPU (Central Processing Unit) 301 executes various kinds of processes according to a program stored in the ROM (Read Only Memory) 302 or a program loaded from the memory section 308 onto the RAM (Random Access Memory) 303. Also, the RAM 303 appropriately stores the data and the like, which are required for the CPU 301 to execute various kinds of processes.

The CPU 301, ROM 302 and RAM 303 are mutually connected through a bus 304. To the bus 304 is also connected an I/O (Input/Output) interface 305.

To the I/O interface 305 are connected: an input section 306 including a keyboard and a mouse; an output section 307 including a display having a CRT (Cathode Ray Tube), an LCD (Liquid Crystal Display) or the like, and a speaker; a memory section 308 including a hard disk; and a communicating section 309 including a modem, a network interface card such as a LAN card, and the like. The communicating section 309 performs a communication process through a network including the Internet.

Also, to the I/O interface 305 is connected a drive 310 as required, and further connected a removable medium 311 such as a magnetic disk, an optical disk, a magneto-optical disk, or a semiconductor memory appropriately. A computer program read out from them can be installed on the memory section 308 as required.

When the series of the processes are carried out by software, programs that constitute the software can be installed from a network such as the Internet or a recording medium including the removable medium 311.

Recording media like this include, independently of the main body of the machine shown in FIG. 26, not only a magnetic disk (including a Floppy Disk (Registered Trademark)), optical disks (including a CD-ROM (Compact Disk-Read Only Memory), and a DVD (Digital Versatile Disk) and a magneto-optical disk (including a MD (Mini-Disk) (Registered Trademark), which have a program recorded therein and can be distributed to deliver the program to users, and means constituted by the removable medium 311 including a semiconductor memory, but also ROM 302 with a program recorded thereon which is delivered to a user in the condition that it has previously been incorporated in the main body of the machine and means constituted by a hard disk, etc. included in the memory section 308.

The steps herein described above to execute a series of the processes include not only the processes carried out in time sequence according to the order of their descriptions, but also the processes that are not necessarily executed in time sequence, but executed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. A recorder operable to compress and code first image data of a moving image, and record the compressed and coded first image data on a recording medium, comprising:
   a receiving mechanism to receive a stream of image data as the first image data;
   a determining mechanism to determine whether a thumbnail image corresponding to the first image data is included in a temporary storage of the recorder;
   an extracting mechanism operable to extract second image data to display a still image from the first image data when the corresponding thumbnail image is not included in the temporary storage and before the coded first image data is recorded;
   a creating mechanism operable to create thumbnail image data to display a thumbnail image as an image smaller than the still image, wherein the thumbnail image data is created as the stream of image data is being received and before recording of the coded first image data on the recording medium; and
   a storage-controlling mechanism operable to control storage of the thumbnail image data in the temporary storage of the recorder, wherein the thumbnail image data and the coded first image data are recorded on the recording medium after the stream of image data is received and coded.

2. The recorder of claim 1, further comprising a display-controlling mechanism operable to control display of the thumbnail image based on the stored thumbnail image data.

3. The recorder of claim 1, further comprising a record-controlling mechanism operable to control recording of the stored thumbnail image data on the recording medium.

4. The recorder of claim 1, wherein the extracting mechanism extracts the second image data from the compressed and coded first image data.

5. The recorder of claim 1, wherein the first image data is multiplexed and the extracting mechanism extracts the second image data from the compressed and coded, and multiplexed first image data.

6. A recording method to compress and code first image data of a moving image, and record the compressed and coded first image data on a recording medium, the recording method being executed by a recorder and comprising:
   receiving a stream of image data as the first image data;
   determining, by using a system controller of the recorder, whether a thumbnail image corresponding to the first image data is included in a temporary storage of the recorder;
   extracting second image data to display a still image from the first image data when the corresponding thumbnail image is not included in the temporary storage and before the coded first image is recorded;
   creating thumbnail image data to display a thumbnail image as an image smaller than the still image, wherein the thumbnail image data is created as the stream of image data is being received and before recording of the coded first image data on the recording medium; and controlling storage of the thumbnail image data in the temporary storage of the recorder, wherein the thumbnail image data and the coded first image data are recorded on the recording medium after the stream of image data is received and coded.

7. A computer-readable storage medium comprising a computer-readable program, which when executed on a recording apparatus causes the recording apparatus to perform a recording process including compressing and coding first image data of a moving image and recording the compressed and coded first image data on a recording medium, the recording process comprising:

receiving a stream of image data as the first image data;
determining whether a thumbnail image corresponding to the first image data is included in a temporary storage of the recording apparatus;
extracting second image data to display a still image from the first image data when the corresponding thumbnail image is not included in the temporary storage and before the coded first image is recorded;
creating thumbnail image data to display a thumbnail image as an image smaller than the still image, wherein the thumbnail image data is created as the stream of image data is being received and before recording of the coded first image data on the recording medium; and
controlling storage of the thumbnail image data in the temporary storage of the recording apparatus, wherein the thumbnail image data and the coded first image data are recorded on the recording medium after the stream of image data is received and coded.

8. A computer-readable storage medium comprising a program, which when executed on a computer causes the computer to perform a recording process including compressing and coding first image data of a moving image, and recording the compressed and coded first image data on a recording medium, the recording process comprising:

receiving a stream of image data as the first image data;
determining whether a thumbnail image corresponding to the first image data is included in a temporary storage of the computer;
extracting second image data to display a still image from the first image data when the corresponding thumbnail image is not included in the temporary storage and before the coded first image is recorded;
creating thumbnail image data to display a thumbnail image as an image smaller than the still image, wherein the thumbnail image data is created as the stream of image data is being received and before recording of the coded first image data on the recording medium; and
controlling storage of the thumbnail image data in the temporary storage of the computer, wherein the thumbnail image data and the coded first image data are recorded on the recording medium after the stream of image data is received and coded.

9. A player operable to read out compressed and coded first image data of a moving image from a data recording medium and reproduce the moving image from the read first image data, comprising:

a reading mechanism to read a stream of image data as the first image data;
a determining mechanism to determine whether a thumbnail image corresponding to the first image data is included in a temporary storage of the player;
an extracting mechanism operable to extract second image data to display a still image from the first image data read out from the data recording medium to reproduce the moving image when the corresponding thumbnail image is not included in the temporary storage and during reading of the stream of image data;
a creating mechanism operable to create thumbnail image data to display a thumbnail image as an image smaller than the still image, wherein the thumbnail image data is created as the stream of image data is being read; and
a storage-controlling mechanism operable to control storage of the thumbnail image data in the temporary storage of the player.

10. The player of claim 9, further comprising a display-controlling mechanism operable to control display of the thumbnail image based on the stored thumbnail image data.

11. The player of claim 9, further comprising a record-controlling mechanism operable to control recording of the stored thumbnail image data on the recording medium.

12. The player of claim 9, wherein the extracting mechanism extracts the second image data from the multiplexed first image data.

13. The player of claim 9, wherein the first image data is multiplexed and the extracting mechanism extracts the second image data from the multiplexed first image data of the moving image.

14. A reproducing method to read out compressed and coded first image data of a moving image from a data recording medium and reproduce the moving image from the read first image data, the reproducing method being executed by a reproduction apparatus and comprising:

reading a stream of image data as the first image data;
determining, by using a system controller of the reproduction apparatus, whether a thumbnail image corresponding to the first image data is included in a temporary storage of the reproduction apparatus;
extracting second image data to display a still image from the first image data read out from the data recording medium to reproduce the moving image when the corresponding thumbnail image is not included in the temporary storage and during reading of the stream of image data;
creating thumbnail image data to display a thumbnail image as an image smaller than the still image, wherein the thumbnail image data is created as the stream of image data is being read; and
controlling storage of the created thumbnail image data in the temporary storage of the reproduction apparatus.

15. A computer-readable storage medium comprising a computer-readable program, which when executed on a reproduction apparatus causes the reproduction apparatus to perform a reproduction process including reading out compressed and coded first image data of a moving image from a data recording medium and reproducing the moving image from the read first image data, the reproduction process comprising:

reading a stream of image data as the first image data;
determining whether a thumbnail image corresponding to the first image data is included in a temporary storage of the reproduction apparatus;
extracting second image data to display a still image from the first image data read out from the data recording medium to reproduce the moving image when the corresponding thumbnail image is not included in the temporary storage and during reading of the stream of image data;
creating thumbnail image data to display a thumbnail image as an image smaller than the still image, wherein the thumbnail image data is created as the stream of image data is being read; and controlling storage of the created thumbnail image data in the temporary storage of the reproduction apparatus.

16. A computer-readable storage medium comprising a program, which when executed on a computer causes the computer to perform a reproduction process including reading out compressed and coded first image data of a moving image from a data recording medium, and reproducing the moving image from the read first image data, the reproduction process comprising:

reading a stream of image data as the first image data;

determining whether a thumbnail image corresponding to the first image data is included in a temporary storage of the computer;

extracting second image data to display a still image from the first image data read out from the data recording medium to reproduce the moving image when the corresponding thumbnail image is not included in the temporary storage and during reading of the stream of image data;

creating thumbnail image data to display a thumbnail image as an image smaller than the still image, wherein the thumbnail image data is created as the stream of image data is being read; and controlling storage of the created thumbnail image data in the temporary storage of the computer.

* * * * *